(12) United States Patent
Hill et al.

(10) Patent No.: US 9,469,081 B2
(45) Date of Patent: Oct. 18, 2016

(54) OPEN PERFORATED MATERIAL

(75) Inventors: George Roland Hill, Bramhall (GB); Mark David Godden, Cahuzac (FR)

(73) Assignee: CONTRA VISION LTD., Bramhall, Stockport, Cheshire (GB)

( * ) Notice: Subject to any disclaimer, the term of this patent is extended or adjusted under 35 U.S.C. 154(b) by 13 days.

(21) Appl. No.: 14/131,139

(22) PCT Filed: Jul. 9, 2012

(86) PCT No.: PCT/IB2012/001352
§ 371 (c)(1),
(2), (4) Date: Jan. 31, 2014

(87) PCT Pub. No.: WO2013/008077
PCT Pub. Date: Jan. 17, 2013

(65) Prior Publication Data
US 2014/0141197 A1    May 22, 2014

Related U.S. Application Data

(60) Provisional application No. 61/505,829, filed on Jul. 8, 2011.

(51) Int. Cl.
*B32B 3/26* (2006.01)
*B41J 3/407* (2006.01)
(Continued)

(52) U.S. Cl.
CPC .............. *B32B 3/266* (2013.01); *B32B 27/06* (2013.01); *B32B 27/08* (2013.01); *B41J 3/407* (2013.01);
(Continued)

(58) Field of Classification Search
CPC ........ B41J 3/407; B41J 3/4078; B41J 3/543; B41M 5/0047; B44C 1/105; B44F 1/00; B32B 27/08; B32B 27/06; B32B 3/266; C09J 7/02; C09J 2201/20; Y10T 428/24322; Y10T 428/14; Y10T 428/1467; Y10T 428/1486
See application file for complete search history.

(56) References Cited

U.S. PATENT DOCUMENTS 4,673,609 A    6/1987    Hill
5,550,346 A    8/1996    Andriash et al.
(Continued)

FOREIGN PATENT DOCUMENTS

EP    1 621 357    2/2006
EP    2 072 264    6/2009
(Continued)

OTHER PUBLICATIONS

International Search Report as issued for International Application No. PCT/IB2012/001352, dated Jan. 31, 2013.
(Continued)

*Primary Examiner* — Patricia L Nordmeyer
(74) *Attorney, Agent, or Firm* — Pillsbury Winthrop Shaw Pittman LLP

(57) ABSTRACT

An open perforated assembly typically includes a film layer (26) on one side of the open perforated assembly, and an adhesive layer (32) and a release liner (42) on the other side. The layers and liner are perforated with a plurality of holes (6). The assembly is devoid of any imperforate layer. The perforated liner has a first color visible from the other side. Upon removal of the perforated release liner the appearance of the assembly from the other side is similar to the appearance before removal of the perforated liner. The assembly may be imaged by digital inkjet printing using a digital inkjet machine. Its printheads are spaced from one side of the open perforated assembly and an ink receiving surface (62) is located on the other side such that ink that is jetted from the printheads and passes through the holes in the open perforated assembly is deposited on the ink receiving surface.

26 Claims, 39 Drawing Sheets

(51) Int. Cl.
   *B41M 5/00* (2006.01)
   *B44C 1/10* (2006.01)
   *B44F 1/00* (2006.01)
   *B41J 3/54* (2006.01)
   *B32B 27/06* (2006.01)
   *B32B 27/08* (2006.01)
   *C09J 7/02* (2006.01)

(52) U.S. Cl.
   CPC ............... *B41J 3/4078* (2013.01); *B41J 3/543* (2013.01); *B41M 5/0047* (2013.01); *B44C 1/105* (2013.01); *B44F 1/00* (2013.01); *C09J 7/02* (2013.01); *C09J 2201/20* (2013.01); *Y10T 428/14* (2015.01); *Y10T 428/24322* (2015.01)

(56) References Cited

U.S. PATENT DOCUMENTS

| | | | |
|---|---|---|---|
| 5,609,938 | A | 3/1997 | Shields |
| 5,679,435 | A | 10/1997 | Andriash |
| 5,858,155 | A | 1/1999 | Hill et al. |
| 5,925,437 | A | 7/1999 | Nelson |
| 6,176,958 | B1 * | 1/2001 | Shea .......................... G09F 7/18 156/253 |
| 6,212,805 | B1 | 4/2001 | Hill |
| RE37,186 | E | 5/2001 | Hill |
| 6,254,711 | B1 * | 7/2001 | Bull et al. ..................... 156/234 |
| 6,258,429 | B1 | 7/2001 | Nelson |
| 6,872,435 | B2 | 3/2005 | Bull et al. |
| 7,897,230 | B2 | 3/2011 | Ross |
| 8,118,399 | B2 | 2/2012 | Kanbara et al. |
| 2002/0155952 | A1 | 10/2002 | Furukawa |
| 2009/0225110 | A1 | 9/2009 | Soler et al. |
| 2010/0181020 | A1 * | 7/2010 | Hill ....................... B44C 1/1708 156/249 |

FOREIGN PATENT DOCUMENTS

| | | |
|---|---|---|
| EP | 2 103 443 | 9/2009 |
| JP | 8-30197 | 2/1996 |
| JP | 2001-290453 | 10/2001 |
| JP | 2002-518217 | 6/2002 |
| JP | 2009-148944 | 7/2009 |
| WO | 9965708 | 12/1999 |
| WO | WO 99/65708 | 12/1999 |
| WO | 2008149301 | 12/2008 |

OTHER PUBLICATIONS

Australian Examination Report as issued in Australian Patent Application No. 2012282211, dated Feb. 2, 2015.
International Preliminary Report on Patentability as issued for International Application No. PCT/IB2012/001352, dated Jan. 23, 2014.
Australian Examination Report as issued in Australian Patent Application No. 2012282211, dated Nov. 25, 2015.
Chinese Office Action issued on May 6, 2016 in corresponding Chinese Patent Application No. 201280041979.6.
Japanese Office Action mailed on Jun. 14, 2016 in corresponding Chinese Patent Application No. 2014-519643.

* cited by examiner

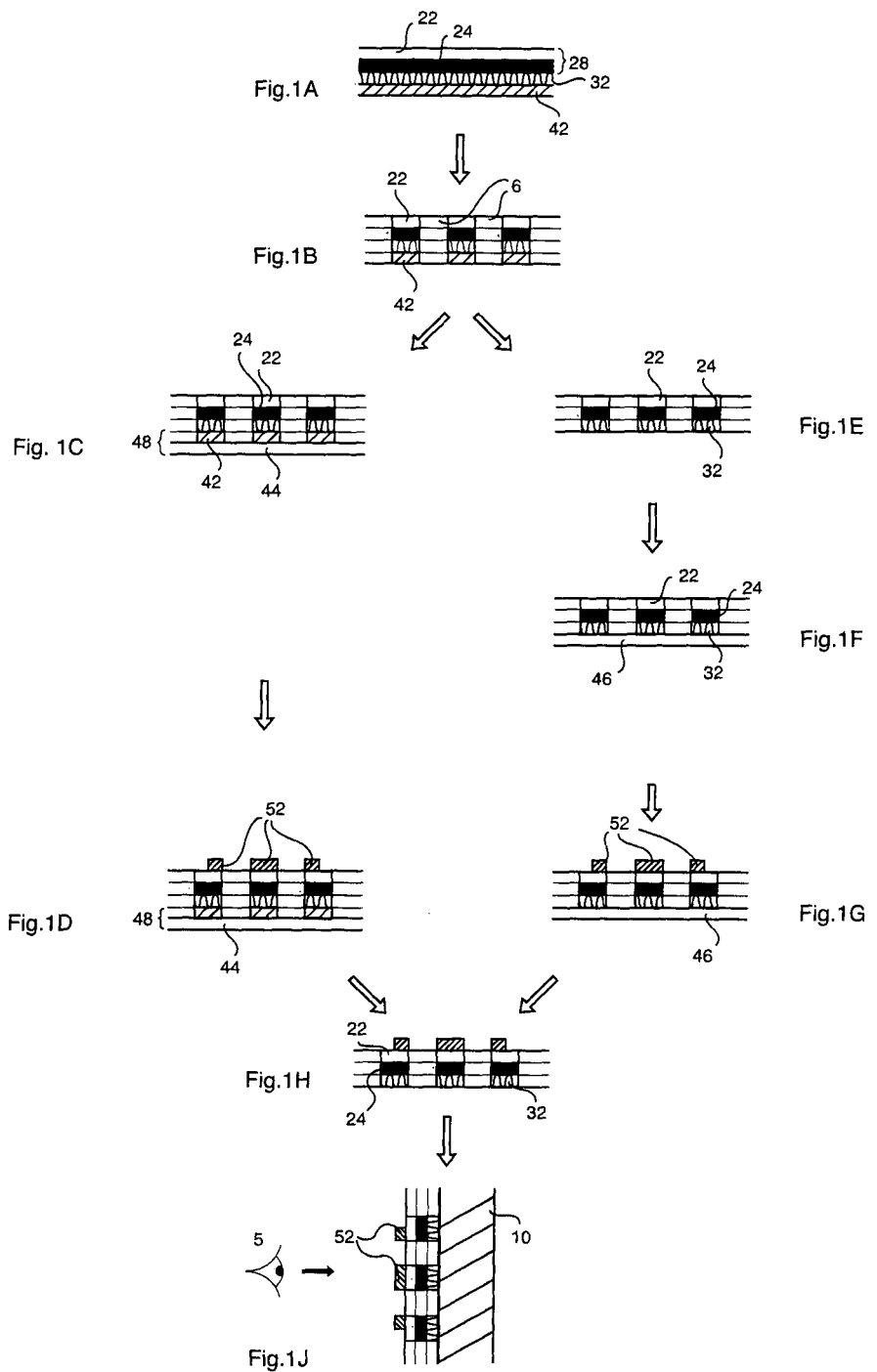

PRIOR ART

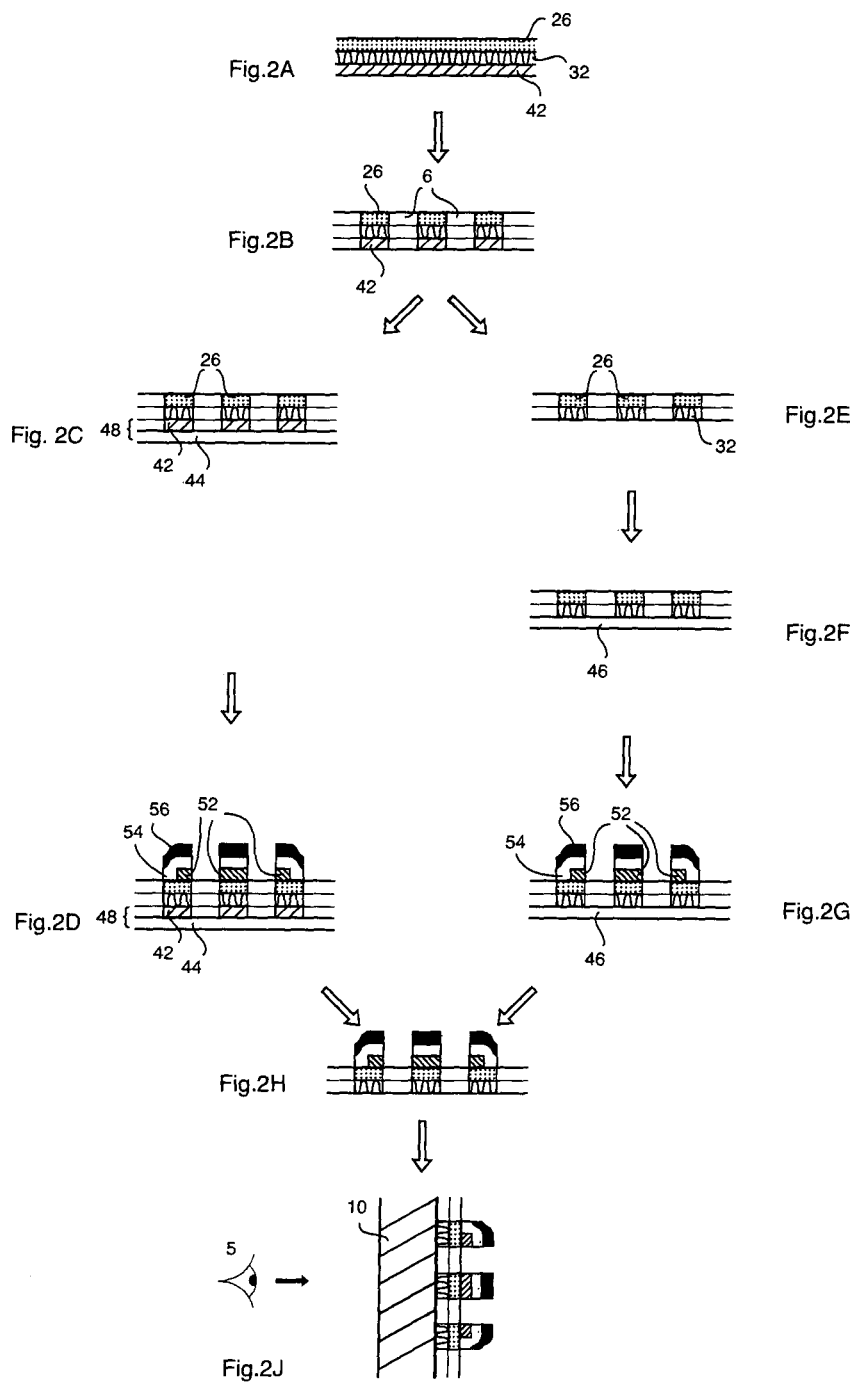
PRIOR ART

PRIOR ART

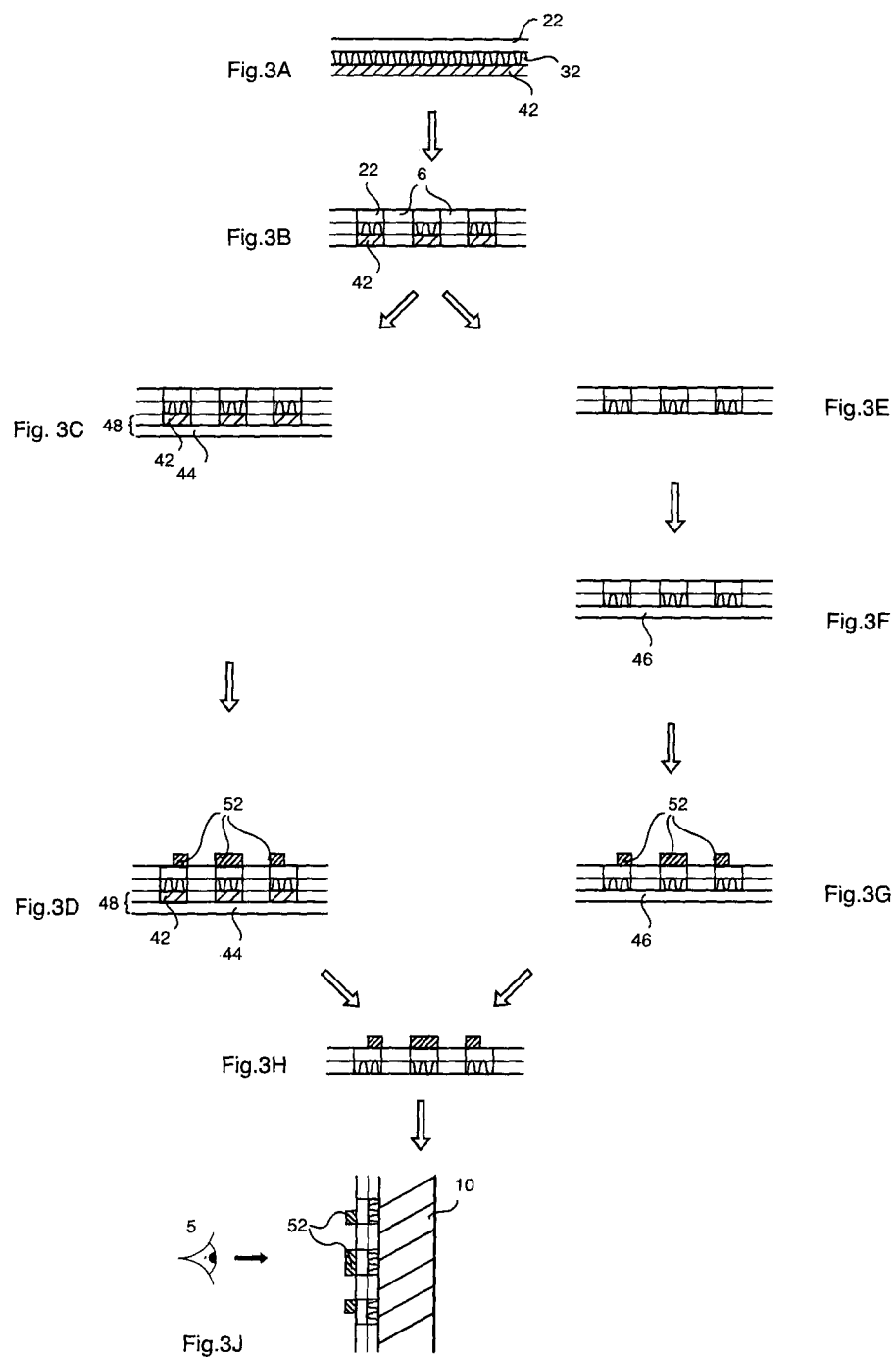

PRIOR ART

PRIOR ART

PRIOR ART

PRIOR ART

PRIOR ART

PRIOR ART

PRIOR ART

PRIOR ART

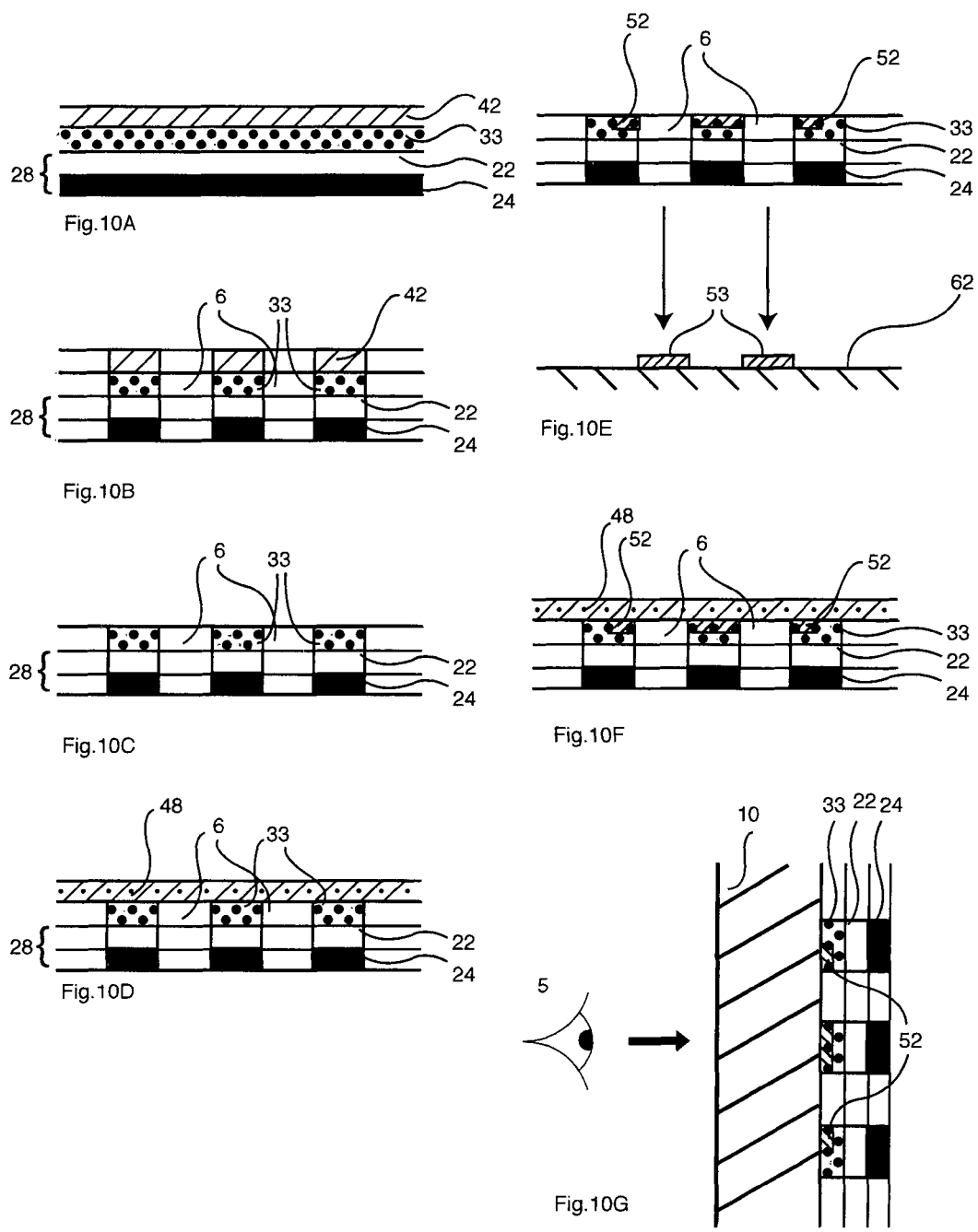

OPEN PERFORATED MATERIAL

CROSS REFERENCE

This application is the U.S. National Stage of PCT/IB2012/001352, filed Jul. 9, 2012, which in turn claims the benefit of priority from U.S. Provisional Application Ser. No. 61/505,829, filed Jul. 8, 2011, titled "Open Perforated Material and Method of Imaging to form a Vision Control Panel."The content of these applications are incorporated herein by reference in their entirety.

BACKGROUND OF THE INVENTION

1. Field of the Invention

The present invention relates generally to perforated materials to be imaged to form one-way vision or other types of vision control panel and their method of imaging.

2. Description of Related Art

Vision control panels are known, for example panels typically comprising a transparent material and a design superimposed on an opaque silhouette pattern, for example a perforated film, as disclosed in U.S. RE37,186 reissued from U.S. Pat. No. 4,673,609, the design being visible from one side of the panel but not from the other side of the panel from which good visibility is obtained through the panel. Other vision control panels have a translucent design visible from one side of the panel superimposed on a translucent "base pattern", typically a translucent white layer, which enables the design to be illuminated from the other side of the panel, as disclosed in U.S. Pat. No. 6,212,805. Both of these documents disclose perforated self-adhesive assemblies comprising a perforated film layer, a perforated adhesive layer and a perforated release liner. In 1993, Visual Technologies, Inc., NC, USA, conceived the idea of adding an additional non-perforated layer to the perforated liner, initially in the form of a self-adhesive "application tape", to enable the resultant assembly with a composite liner comprising the perforated release liner and the non-perforated application tape to be imaged by a screen printing press with a vacuum bed. A vacuum bed cannot operate effectively with a substantial proportion of perforations in a substrate. Visual Technologies, Inc. made this idea public in September 1993, all as evidenced in the Reissue of U.S. Pat. No. 5,609,938 and the related Public Use Proceedings in the US Patent and Trademark Office.

The electrostatic transfer imaging of a perforated assembly was also made public in 1993 in the brochure of ImagoImage, Inc., US. The method comprised first printing an image on a transfer medium electrographically with toner. The image was then transferred from the transfer medium to the solid areas only of the perforated vinyl by means of a hot roller laminator. No image material entered the perforation holes. The imaged perforated material typically required a transparent self-adhesive overlaminate to protect the image from UV radiation and abrasion. Also, overlaminates are often applied to perforated materials applied to the outside of a window to avoid rain ingress into the holes. Rain-water forms a meniscus and thereby a lens effect in each hole, which makes the self-adhesive assembly on a window appear like deformé glass, preventing clarity of through vision. Such a self-adhesive overlaminate on an imaged, open, perforated self-adhesive assembly would have resulted in exposed pressure-sensitive adhesive in the holes, causing dust and other impurities that entered the holes to adhere to the pressure-sensitive adhesive before application of the imaged, overlaminated assembly to a window, thereby detracting from through visibility. For these reasons, an additional non-perforated backing layer was also a standard component of self-adhesive assemblies imaged by the electrostatic transfer process, to avoid such contamination. The additional non-perforated layer was incorporated into perforated self-adhesive assemblies for other reasons, for example to prevent paint from the process of air brushing an image passing through the perforated self-adhesive assembly.

U.S. Pat. No. 5,858,155 discloses a perforated adhesive assembly with a non-perforated replacement liner applied to the perforated adhesive layer after removal of a temporary perforated liner, to achieve similar and additional benefits of an additional non-perforated layer.

Even digital imaging systems which would not transmit marking material through the holes used perforated assemblies with a non-perforated layer. For example thermal transfer imaging, for example using a thermal transfer digital press such as the Gerber Edge™ by Gerber Scientific Instruments, Inc., CT, USA, used a perforated material assembly comprising a replacement liner. One reason for this is that perforated materials with a non-perforated layer were the only ones on the market but also the Gerber Edge is sprocket driven, requiring a replacement liner in order to provide a layer of the assembly which can be punched with sprocket holes and which is subsequently strong enough to withstand the sprocket drive mechanism.

Inkjet printing machines for wide-format imaging of large graphics for display and other purposes came into common usage during the mid to late 1990's to become the dominant large format digital imaging system, for example including the printing of bus wraps, building wraps and retail window graphics, using the perforated materials of either the additional liner construction or the replacement liner construction. The solid liner was essential to collect ink which passed through the perforation holes.

In summary, while a simple perforated self-adhesive assembly of perforated film facestock, perforated adhesive layer and perforated liner was disclosed in U.S. Pat. No. 4,673,609, published in 1987, reissued as U.S. RE37,186, such assemblies were impractical and the perforated self-adhesive assemblies for imaging and application to windows available on the market have been one of the above two types with a solid, non-perforated layer, either an additional non-perforated backing layer or a non-perforated replacement liner. Such products have been imaged by a variety of techniques, including screen printing and various digital imaging methods, including electrostatic transfer printing and thermal transfer printing, and UV, solvent, eco-solvent, water-based and latex inkjet printing.

An additional non-perforated backing layer has typically been provided by an opaque white self-adhesive paper "application tape" or by a translucent heat-bonded plastic film; typically a translucent polypropylene or polyethylene film. A replacement liner has typically been of opaque white paper. When imaged with a design and applied to a window, such products are typically intended to be seen from outside the window, for example of a building or vehicle, illuminated by natural daylight or artificial illumination. For one-way vision products, there is typically a black PVC layer or a black adhesive layer facing inwards, such light-absorbing color assisting vision out of the window compared to a more reflective surface. Such products have been manufactured under license to the Contra Vision Ltd (UK) group of companies by licensees including 3M (Minnesota Mining and Manufacturing Company, US), Avery Dennison, Inc., US, FLEXcon, Inc., US, LG Chem (S. Korea) and Orafol (Germany).

If a prior art inkjet printer with a platen had been used for printing perforated materials without an imperforate layer, inkjet ink would have passed through the perforation holes in the perforated material onto the platen and from there be applied to the liner and drawn along in the subsequent movement of the perforated material through the machine. A non-perforated layer in an assembly was conventionally also required for printing on an inkjet printer with a partial vacuum platen or partial vacuum printbed, as the platen or bed comprises holes and a partial vacuum system for holding down the substrate, which could not operate with an open perforated material and which would cause ink to be sucked through the holes. This contamination would eventually seriously damage the machine, as well as the printed product being spoiled by unwanted ink spreading to other parts of the product than where it was intended to be deposited. For these reasons, additional liner or replacement liner perforated assemblies comprising a solid, non-perforated layer have been consistently and invariably used for inkjet imaging of perforated materials.

However, the inkjet printing of the prior art perforated materials with a non-perforated layer has a number of disadvantages depending on the type of inkjet ink being used. With prior art self-adhesive assemblies with an additional non-perforated backing layer, the inevitable distortion of the perforated adhesive assembly during the punching process is "locked in" by the application of the additional non-perforated backing layer. This causes incomplete contact between the pressure-sensitive adhesive and a window following removal of the composite liner of the perforated release liner and the non-perforated backing layer and the application of the self-adhesive film to a window. In contrast, the replacement liner construction allows the pressure-sensitive adhesive to "wet-out" on the plane surface of the replacement liner, providing overall contact between the adhesive and the window with the exception of the hole areas. Replacement liner construction is also preferred for a number of other reasons, including so-called "lay-flat" properties. However, it has been found in practice that when imaging such a replacement liner construction by means of UV curable inkjet ink, in dark areas of the design or other areas of relatively high ink deposition, upon removal of the replacement liner, the UV-cured ink can remain spanning across the holes, either as a continuous layer or a lattice of cured inkjet material. Such blocked holes or partially blocked holes are only identified upon removal of the replacement liner, typically on site during application to a window, when removal of the ink blockages is extremely difficult, if not totally impractical.

Separately, when imaging the replacement liner construction with solvent inkjet ink, the ink entering the holes lies and coalesces on the release surface of the replacement liner and is relatively difficult to dry, as it is removed from and relatively protected from the passage of any drying air across the surface of the material. It has been found that, if such coalesced droplets migrate to the edges of the holes, solvents in the ink can deleteriously affect the subsequent performance of the pressure-sensitive adhesive contiguous with the release surface of the replacement liner. The difficulty of drying inkjet ink residing in perforation holes also applies to water-based inkjet inks and the so-called "latex" inkjet inks sold by Hewlett Packard, CA, USA. Such uncured inkjet ink residing on the surface of the liner can also cause discoloration of the adhesive which is particularly damaging with clear perforated materials for inside application to a window, as the discolored adhesive will be visible from outside the window. U.S. Pat. No. 7,897,230 discloses an "ink retention layer" to absorb excess solvent based ink that can otherwise migrate to and detract from the performance of the adhesive layer.

Solvent ink which coalesces into globules on the exposed release surface of the liner, only covers a small percentage of the exposed hole area, the remainder typically remaining white and thus lightening the perceived image, providing a pale, "washed-out" impression. This effect causes additional amounts of ink to be applied to perforated materials in an attempt to overcome this problem. It has been found that printing companies and even inkjet machine manufacturers consistently input machine settings to apply more ink than is necessary and thus require more curing than is necessary, when imaging these prior art perforated materials with a white or translucent non-perforated layer, wasting curing energy as well as ink. WO 2008/149301 discloses a gray, non-perforated additional layer or replacement liner visible through the perforation holes to overcome these problems.

Digital inkjet imaging systems with an "open gutter" or "ink collector" instead of a conventional solid or partial vacuum platen are known in the field of imaging open fabrics (woven or non-woven) or mesh materials without a non-perforated backing layer. Excess ink which passes through the open areas or voids in the fabric or mesh material is collected in a gutter, typically containing an absorbent removable material such as blotting paper or plastic foam material. However, digital inkjet machines with an open gutter to print fabrics typically comprise a relatively complex handling system to cater for and counteract the dimensional instability of fabric that would otherwise cause unacceptable loss of printing registration and other potential defects in the finished printed product. Thus such machines developed for the printing of fabrics by digital inkjet have an arrangement of tension and other control devices in order to transport the fabric through the printing press in a manner that is intended to minimize geometric distortion of the fabric, which would otherwise worsen the lack of registration between successive printhead passes over the fabric or caused by movement of the fabric and can even lead to unprinted areas in folds of fabric. Fabrics and meshes are typically of light weight in relation to their in-plane tensile strength, especially in the direction of the weft. It is important that the fabric is tensioned across an open gutter, to minimise variation in the distance between the inkjet printheads and the fabric being printed, the so-called "print distance", as this dimension affects the quality of the resultant print. The tensioning devices on such machines for use with an "open gutter" are designed for fabrics, which typically have a very low mass/tensile strength ratio. Fabric printing machines typically have a relatively long lead length passing through an array of rollers controlling the tension in the fabric.

Conversely, inkjet printing machines for printing self-adhesive vinyl assemblies typically have 'push' feed nip rollers, not the tensioned pulling nip rollers used for fabric printing. The self-adhesive vinyl has sufficient flexural rigidity to be pushed forward and be temporarily held down by a suction platen while being printed and then released and fed forwards. This preferable arrangement enables the self-adhesive vinyl assembles to be cut immediately after the zone of printing, whereas fabric inkjet printers require continuous roller feed and take-up configurations to maintain the required tension feed, causing leading and trailing wastage of material. This separation of technology and use for fabric and mesh printing as opposed to self-adhesive vinyl and other substrates was of common general knowledge as well as known to one of ordinary skills in the art, summarised in "Industrial Inkjet for DUMMIES" published by Wiley Publishing, Inc. in 2010, page 41 "Textile printing machines look very much like a typical digital wide-format printer with special materials-handling systems to ensure that the textile is firmly held in place."

EP 2103443 A1 discloses a perforated one-way vision film comprising a base material with an adhered foam layer that will adhere to a window before and after inkjet imaging with a design, the base material being a film or non-woven fabric, and the imaging of fabric products by an inkjet printer with an ink collector.

U.S. Pat. No. 5,550,346 and U.S. Pat. No. 5,679,435 disclose the laser perforation of retro-reflective self-adhesive assemblies. Perforation by laser typically results in a dark, burnt perimeter to each of the perforation holes.

Prior art one-way vision perforated materials comprising a white layer suffer from a "ghost image" being visible from the side of the panel remote from the design, owing to inkjet ink which is deposited on the inside edges of the holes being visible against the white layer, especially when viewed from an acute angle to the one-way vision panel. Incomplete deposition of ink upon in-hole white material also results in amended perceived colors when seen at acute angles from the imaged side of the panel, for example the "whitening" or reduction in graytone of dark colors. Further, through-vision at acute angles is impaired by white material being visible from the through-vision side of the panel, black being the ideal color to allow through vision through the adjacent holes.

SUMMARY OF EMBODIMENTS OF THE INVENTION

One or more embodiments of the present invention overcomes one or more problems of prior art perforated self-adhesive assemblies comprising a non-perforated layer and the problems of imaging the prior art perforated adhesive assemblies comprising a non-perforated layer.

According to one or more embodiments of the present invention, there is a method of imaging an open perforated assembly comprising a film layer, said open perforated assembly being perforated with a plurality of holes, said open perforated assembly being devoid of any imperforate layer, said perforated assembly being imaged with a design to form an imaged perforated assembly, and through vision being enabled through said holes, said method of imaging comprising:

imaging said open perforated assembly by digital inkjet printing using a digital inkjet machine comprising inkjet printheads, wherein said printheads are spaced from one side of said open perforated assembly and an ink receiving surface is located on the other side of said open perforated assembly such that ink that is jetted from said printheads and passes through said holes in the open perforated assembly is deposited on the ink receiving surface.

According to another aspect of one or more embodiments of the present invention, there is an open perforated assembly comprising a film layer on one side of said open perforated assembly, an adhesive layer and a release liner on the other side of said assembly, said film layer, said adhesive layer and said release liner being perforated with a plurality of holes, said open perforated assembly being devoid of any imperforate layer, wherein the perforated release liner comprises a first color visible from said other side of said assembly, wherein upon removal of the perforated release liner the light transmissivity of the assembly is within a variance of 5% to the light transmissivity before removal of the perforated release liner and wherein the average graytone of the color of the solid portions of the assembly from said other side of said assembly is within a graytone variance of 30% to the average graytone of the solid portions of the assembly before removal of the perforated release liner.

According to a further aspect of one or more embodiments of the present invention, said open perforated assembly comprises an image applied to said assembly.

A feature of one or more embodiments of the invention provides an open hole assembly with a design which is imaged by inkjet printing and the through holes enable a background such as a building interior to be seen through the holes and so provide a realistic impression of the assembly following application to a window. Another feature of one or more embodiments of the invention provides an open perforated self-adhesive assembly with a release liner of a first color visible from the other side of the assembly that appears similar to the color of the other side of the assembly following removal of the perforated release liner, both before and after imaging. Another feature of one or more embodiments of the invention enables a perforated adhesive assembly of cheaper construction than those conventionally used in the field of vision control panels. Another feature of one or more embodiments avoids the undesirable effects of ink that passes through the holes being received on the non-perforated layer of a conventional perforated adhesive assembly, for example leading to solvent ink damaging the adhesive layer or UV-cured ink being retained in the holes upon removal of the release liner. One or more embodiments of the invention removes the need for a "solvent retention layer". Another feature of one or more embodiments the invention reduces the amount of ink typically consumed in the printing of existing perforated adhesive assemblies, by not having a prior art white non-perforated layer. One or more embodiments of the invention also removes the need to provide a gray liner to simulate the effect of the imaged assembly when applied to a window. Another feature of one or more embodiments of the invention enables eco-friendly disposal or recycling of the unwanted ink that passes though the holes in the perforated adhesive assembly in contrast to the present typical disposal of the liner into general trash when removed on site to enable application of the imaged perforated assembly to a window. Another feature of one or more embodiments of the invention reduces the weight, thickness and stiffness of a perforated adhesive assembly in order to improve its printability by an inkjet printing machine comprising an open gutter. Another feature of one or more embodiments of the invention improves the drying and/or curing and/or cooling of inkjet ink on the surface of a perforated assembly. Another feature of one or more embodiments of the invention provides a perforated assembly that can be "read" in an inkjet printing machine prior to imaging to enable the inkjet ink to be deposited primarily on the imperforate portions of the perforated assembly and primarily not be ejected over the hole portions. Another feature of one or more embodiments of the invention enables an imaged open perforated self-adhesive assembly with a release liner that is light-absorbing to form a one-way vision panel without removal of the liner, for example used as a hanging banner. Another feature of one or more embodiments of the invention applies an air-permeable premask to the imaged surface of an imaged open perforated assembly to temporarily improve the handlability and dimensional stability and protect the image prior to application of the assembly to a window and subsequent removal of the premask to leave an imaged perforated adhesive assembly on the window. Another feature of one or more embodiments of the invention adapts an inkjet printing machine and set-up which are intended to print fabrics or mesh to accommodate different inks and different substrate tensions during the printing process to enable the printing of a perforated assembly.

One or more embodiments of the invention provides a perforated assembly comprising an imaging layer and optionally a tensile strength layer and, optionally, an adhesive layer that are all bio-degradable or are suitable for incineration in an energy generating plant.

One or more embodiments of the invention provides a punch-perforated material that is intended for imaging on the opposite surface to that which the punching tools are first presented.

One or more embodiments of the invention provides an open perforated self-adhesive assembly in which the adhesive layer can be inkjet printed with a design and the imaged assembly applied to a second surface of a transparent material and the design be visible from the side of the first surface of the transparent material.

One or more embodiments of the invention provides a method of imaging an open perforated assembly and subsequently applying adhesive to the imaged surface.

One or more embodiments of the invention provides a universal open perforated self-adhesive assembly, for application to the outside or inside of a window or act as a hanging banner.

One or more embodiments of the invention comprise coated edges to the perforation holes which eliminates the problems of a "ghost image" being visible from the side of the assembly remote from the imaged side, the "whitening" of image colors and the degradation of through vision all caused by exposed white edges inside perforation holes.

For an equivalent specification of film, adhesive and release liner, the perforated adhesive assemblies of one or more embodiments of the present invention are less costly than conventional perforated adhesive assemblies on the market, as there is no additional non-perforated backing layer or no removal of a perforated liner during the manufacturing process and provision of a replacement liner. Additionally, in the manufacture of products with an imperforate layer, disruption of the production process is typically required because a conventional perforating company and perforating space is not typically equipped and does not have the environmental conditions suitable for adding a non-perforated additional backing layer or undertaking the replacement liner process, the former requiring cleaner conditions than typically exist in a perforation area and the latter typically requiring clean room conditions, for example as typically provided in a manufacturing plant for self-adhesive assemblies.

A "perforated material" is a material that has holes formed in the material after the manufacture of the material, for example by punching, for example a step and repeat punch perforating machine or a cylindrical punching machine, laser cutting, knife cutting, burning, solvent etching or any other means of ablating the full depth of the material.

An "open perforated assembly" is a perforated assembly that is devoid of any non-perforated layer. An open perforated assembly includes a perforated single layer. An open perforated assembly is optionally overlaminated after imaging.

An "open weave fabric or mesh" comprises voids integral to the manufacture of the open weave fabric or mesh. Open weave fabrics or meshes typically have a non-perforated backing layer to enable them to be printed on most types of inkjet printers. However, there are prior art inkjet printers that enable the printing of open weave fabrics and meshes without a non-perforated backing layer, typically comprising an "open gutter" or "ink collector" to receive inkjet ink that passes through the voids of such an open weave fabric or mesh.

A "self-adhesive material" is one that can be adhered to a surface, for example the surface of a window, by the application of pressure alone. Self-adhesive materials typically comprise a pressure-sensitive adhesive or have so-called static cling properties, the surface of the material and the supporting surface being sufficiently smooth and the contact sufficiently intimate to support the weight of the material. A pressure-sensitive adhesive can be one of many types, for example a solvent-based or water-based pressure-sensitive adhesive or a foamed layer comprising surface recesses as disclosed in EP 2103443 A1. Self-adhesive materials also include synthetic setae or other so-called "dry adhesive".

A "film layer" is a flexible material, for example a plastic film, for example comprising polyvinyl chloride (PVC), sometimes referred to as "vinyl," polyester (PET), poly-olefin, poly-paraphenylene terephthalamide—branded Tyvek®, a trademark of E. I. du Pont de Nemours and Company, paper or synthetic paper. Film layers optionally comprise laminates of similar or different filmic materials, for example a white polyester film laminated to a black pvc film or a white PVC film laminated to a black polyester film, the polyester film, for example, to provide enhanced tensile strength, for example to enable higher tensioning of an open perforated assembly across an open gutter in an inkjet printing machine typically used for fabric printing. A film layer is optionally coated, for example with an ink receptive surface or a colorant, or is treated to increase the surface energy, typically to enhance the bond of marking material, for example corona treatment or flame plasma surface treatment. The term film layer should also be understood according to the present invention to include semi-rigid and rigid sheet materials, for example of PVC, acrylic, polycarbonate, cardboard, metal, for example steel or aluminum, wood or wood-based products, fiber reinforced materials, for example carbon, or glass fiber reinforced materials.

A "release liner" typically comprises a filmic material, for example of paper or plastic with a surface or applied layer that comprises a "release surface" enabling its removal from an adhesive surface, a static cling surface or other surface which it protects prior to such removal. Suitable release coatings include silicone.

An "opaque material" is a material that substantially occludes the through passage of light. As used herein, an opaque material has a light transmissivity of 0%-5%.

A "translucent material" is a material that allows the through passage of light but is not a "transparent material". As used herein, translucent materials have a light transmissivity of greater than 5%. Examples of translucent materials include PVC, polypropylene or polyethylene of an etched or milky appearance or white ink that is not opaque and cyan, magenta, yellow and black (CMYK) process inks.

A "clear" material has no significant color (sometimes referred to in the art as "water clear") and, if laminated to or is otherwise contiguous with an image, does not significantly distort the image including colors within the image. As used herein, the term "color" can apply to "clear".

A "transparent material" enables an observer on one side of the material to focus on an object on the other side of and spaced from the transparent material. A transparent material is typically "water clear" but optionally is tinted and typically comprises two plane parallel surfaces.

"Digital inkjet printing" an open perforated assembly means any method of imaging an open perforated assembly comprising the digitally managed projection of colorant onto an open perforated assembly and through the holes of an open perforated assembly, for example of inkjet ink or toner.

"Graytone" is used herein to define the lightness or darkness of a colour, from 0% for white to 100% for black. A clear material has a graytone of 0% as used herein.

One reason why prior art open perforated materials have conventionally not been printed on inkjet printers intended for the printing of open weave fabrics and meshes is that open perforated self-adhesive assemblies have a very much greater mass/unit area than typical open weave fabrics or meshes, which means that the inevitable catenary shape formed by the suspension of the material across an open gutter comprises significantly greater deflection than with a typical open weave fabric or mesh, thus providing a significantly variable "print distance" from an inkjet printhead's nozzles to the printing or imaging surface of the substrate, a variable which affects printing quality significantly. This factor is increased by the increased width of an open gutter, which must contain the width of the "swathe" or the width of print that is produced by one pass of the printhead assembly, which can either be a single printhead, a line of printheads or an array of overlapping printheads providing a wider "swathe" of imaging than the width of a single printhead.

An inkjet printer typically comprises a plurality of printheads in a printhead array mounted on a head carriage running along a "printbar", "beam" or "bridge", which typically is moveable relative to the substrate being printed, the substrate typically being either (i) "roll fed" over a "printing platen" or (ii) static or (iii) fixed to a printbed that is movable or (iv) being roll fed across a printbed. Platens and printbeds typically comprise an array of holes enabling a partial vacuum holding down of a solid, non-perforated substrate. Open weave fabrics and meshes are typically roll fed over an "open gutter" which receives ink passing through the voids in the open weave fabrics or meshes, special tensioning devices being required to reduce the deflection of the material over the open gutter and otherwise avoid undue distortion of the material during the printing process.

One or more embodiments of the invention have open holes that, following imaging, allow vision through the holes against any selected background, for example being temporarily held against a window so that its visual characteristics can be assessed before being applied to another window or other intended surface.

Some embodiments of the invention enable an imaged open perforated self-adhesive assembly with a perforated liner to have similar appearances from both sides to the corresponding appearances after they are in use, for example after removal of the liner and application to a window, which may be termed WYSIWYG-WATAW (what you see is what you get—when applied to a window). For example, this feature is achieved with a white on black face film or a white face film and a black adhesive if the liner is black, for example black paper, or has a black surface, for example a black printed or coated white paper. For a transparent face film, the liner should be transparent, for example polyester film, to be WYSIWYG-WATAW. In the case of a translucent white face film, for example to make panels according to U.S. Pat. No. 6,212,805, the liner according to one or more embodiments should be transparent to be WYSIWYG-WATAW, as an opaque white liner would not achieve the same effect, neither would a translucent white liner, as the combination of the translucent face film and the translucent liner would achieve a less translucent (less light transmissivity) effect.

As well as achieving a realistic impression of the finished product after printing, for example not suffering from the whitening or paling effect of a prior art, white, non-perforated liner, the product according to one or more embodiments can be assessed and quality assured in a realistic situation, for example held against a window and viewed from both outside and inside with the image facing outside and same color, typically black, visible from the inside as in the actual installation. Furthermore, the imaged, open perforated assembly according to one or more embodiments can be dispatched to site and used in a number of ways. For example, as well as the typically intended removal of the liner and application to a window, the imaged open perforated assembly according to one or more embodiments, for example an advertisement, can be suspended as a banner or fixed by an alternative means against a window, for example by discrete self-adhesive tabs or suction devices, thus avoiding the overall application of pressure-sensitive adhesive to a window which is regarded as undesirable or precluded by some retailers. Thus point of purchase advertisements according to one or more embodiments the invention will have a higher percentage usage than prior art perforated material point of purchase advertisements.

According to another aspect of one or more embodiments of the invention, open perforated assemblies comprising a white perforated liner, typically white paper, will at least have the advantage over prior art perforated assemblies of being WYSIWYG "what you see is what you get" from the front of the assembly after imaging and after application to a window. When viewed from the imaged side for both white on black and translucent white film layers, the perforation holes allow a realistic impression of the visibility of interior space if held against a window and allow through vision from the other side before and after printing. Even clear film with a white perforated liner according to one or more embodiments has the advantage over the prior art assemblies of enabling through vision before and after imaging, the white liner also allowing assessment of the quality of a typical CMYK image, albeit typically reverse-reading, and the holes allowing a realistic impression of the visibility of interior space if held against a window, unlike the prior art clear perforated material assemblies with a non-perforated white layer.

Imaging methods according to one or more embodiments of the invention include the use of prior art inkjet equipment used for printing open weave fabric or meshes without a backing layer, typically with increased tension and/or intermediate supports in an open gutter to maintain the open perforated assembly, typically heavier than open weave fabric or mesh, within an acceptable range of "print distance" from the inkjet nozzles.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one or more embodiments of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where:

FIGS. 1A-1H and 1J are diagrammatic cross-sections through stages of production of PRIOR ART perforated assemblies comprising a non-perforated layer.

FIGS. 2A-2H and 2J are diagrammatic cross-sections through stages of production of PRIOR ART perforated assemblies comprising a non-perforated layer.

FIGS. 3A-3H and 3J are diagrammatic cross-sections through stages of production of PRIOR ART perforated assemblies comprising a non-perforated layer.

FIGS. 4A-4H are diagrammatic cross-sections through stages of production of PRIOR ART perforated assemblies comprising a non-perforated layer.

FIGS. 10A-10G are diagrammatic cross-sections through stages of production of open perforated self-adhesive assemblies according to one or more embodiments of the present invention.

DETAILED DESCRIPTION OF EXEMPLARY EMBODIMENTS OF THE INVENTION

Figure 1K:
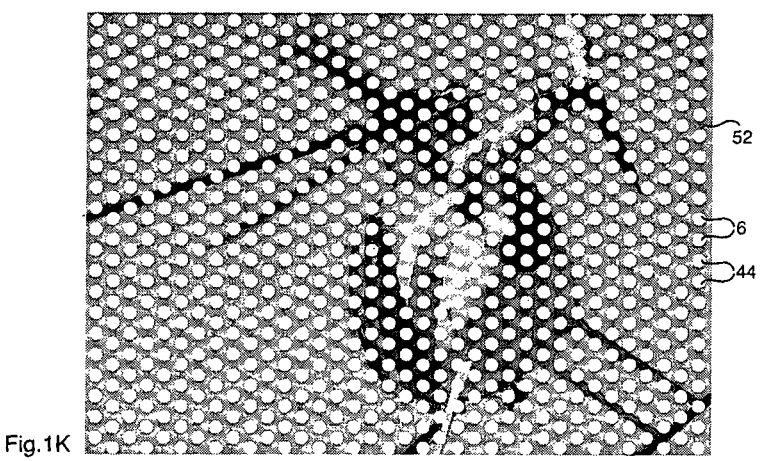
FIGS. 1K-1M are diagrammatic elevations of PRIOR ART perforated assemblies comprising a non-perforated layer.
Figure 1L:
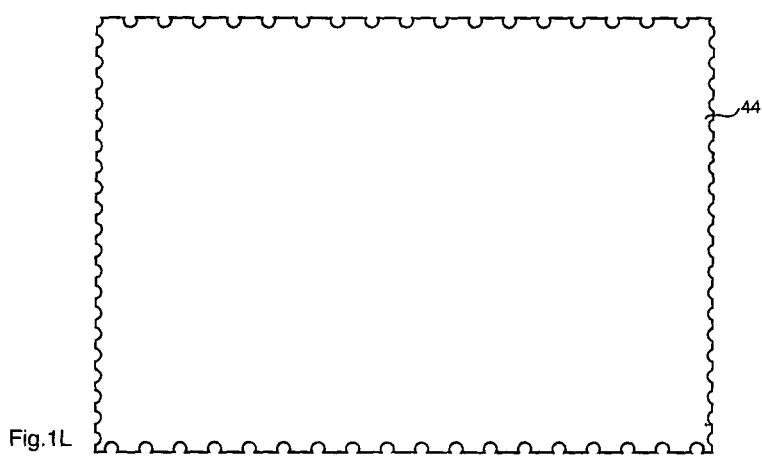
Figure 1M:
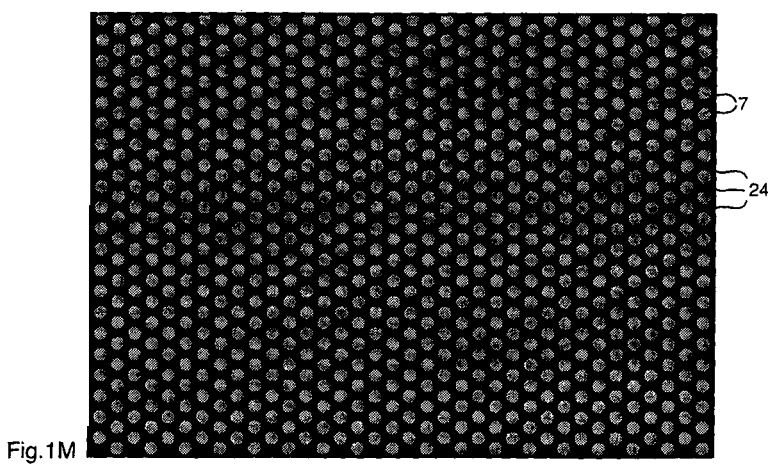

Prior art FIGS. 1A-1J illustrate prior art methods of making, imaging and using perforated adhesive assemblies for application to the outside of a window. In FIG. 1A, a typical self-adhesive face film 28 comprises a white vinyl layer 22 laminated to a black vinyl layer 24 with an adhesive layer 32 and liner 42, all layers being perforated with holes 6 in FIG. 1B. To make the "additional liner" construction of conventional types of perforated material, in FIG. 1C, a non-perforated additional backing layer 44 is adhered to the perforated liner 42 to form a composite liner 48. The alternative "replacement liner" construction is shown in FIGS. 1E and 1F, in which the perforated liner 42 of FIG. 1B is removed and replaced by replacement liner 46. FIGS. 1D-1J show subsequent imaging of a design 52, for example by screen printing, thermal transfer or electrostatic transfer, in which no imaging material passes through the holes 6, removal of the liner and application to a based material 10, typically to the outside of a window, in FIG. 1J, which shows an observer 5 being able to view the design 52 from the outside of the window but which is not visible from the inside of the window, sometimes referred to as a one-way vision graphic. FIG. 1K is an elevation of the printed side of the imaged assembly of FIG. 1D but encompassing more perforations, showing design 52 seen against non-perforated additional backing layer 44 through holes 6. FIG. 1L illustrates the other side of the imaged assembly of FIG. 1D, being non-perforated additional backing layer 44. FIG. 1M shows the other side of the assembly of FIG. 1H after removal of composite liner 28. Elevations of the other side of FIGS. 1G and 1H would be similar to FIGS. 1L and 1M before and after removal of the liner, in this case replacement liner 46. In each case, open or through holes 7 in FIG. 1M allow good through vision, light-absorbing layer 24 not reflecting substantial light to detract from such through vision.

Figure 2K:
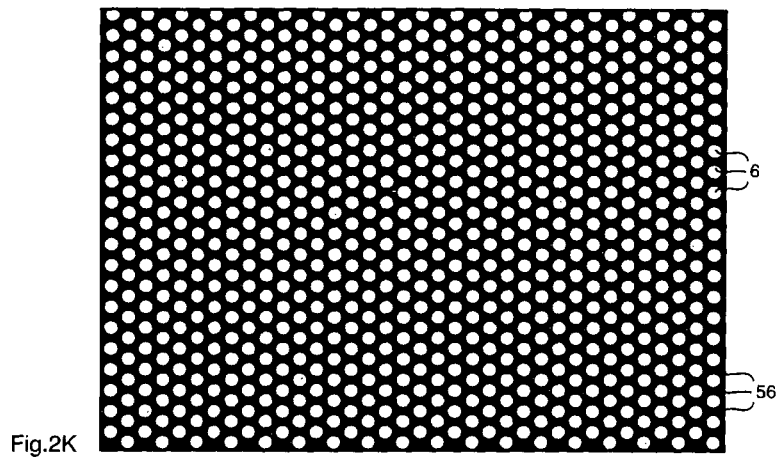
FIGS. 2K-2M are diagrammatic elevations of PRIOR ART perforated assemblies comprising a non-perforated layer.
Figure 2L:
Figure 2M:

FIGS. 2A-2J are similar to FIGS. 1A-1J except that the face film 26 is transparent and is imaged by a reverse printed design 52 with white background layer 54 and black background layer 56 to achieve a one-way vision graphic applied to the inside of a window as shown in FIG. 2J. FIG. 2K is an elevation of the printed side of the imaged assembly of FIG. 2D but encompassing more perforations, showing imaged, light-absorbing backing layer 56, typically black, seen against non-perforated additional backing layer 44 through holes 6. FIG. 2L illustrates the other side of the imaged assembly of FIG. 2D, being non-perforated additional backing layer 44. FIG. 2M shows the other side of the assembly of FIG. 2H after removal of composite liner 48, being design 52 and holes 7 through all layers of the assembly. Elevations of the other side of FIGS. 2G and 2H would be similar to FIGS. 2L and 2M before and after removal of the liner, in this case replacement liner 46.

Figure 3K:
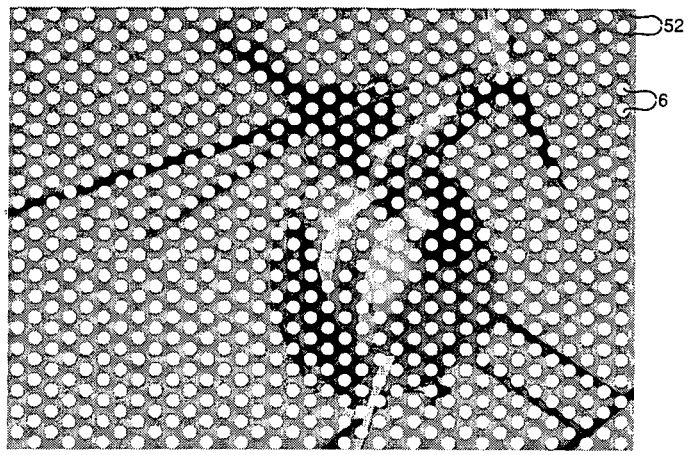
FIGS. 3K-3M are diagrammatic elevations of PRIOR ART perforated assemblies comprising a non-perforated layer.
Figure 3L:
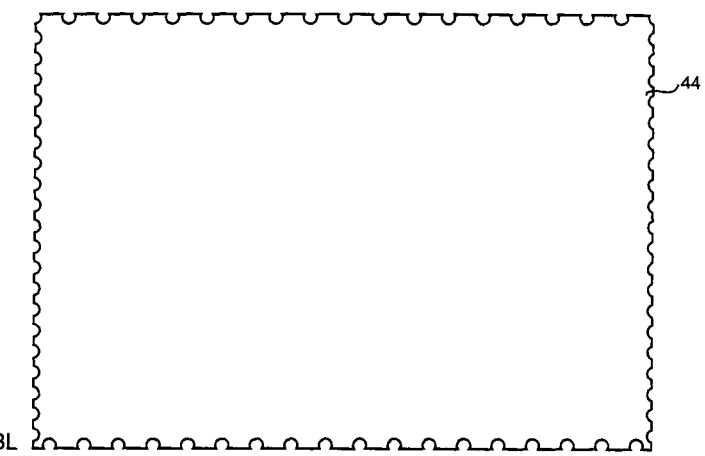
Figure 3M:
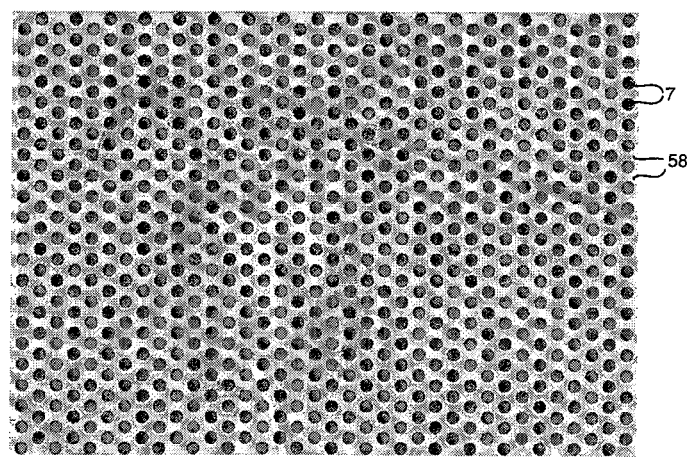

FIGS. 3A-3J show similar stages of production of a different type of see-through graphic according to U.S. Pat. No. 6,212,805 with a white translucent perforated face film 22 with no black layer, which enables design 52 to be illuminated from inside a window 10 in FIG. 3J, to be visible to an observer 5 from the outside of the window 10 during the hours of darkness. FIG. 3K is an elevation of the printed side of the imaged assembly of FIG. 3D but encompassing more perforations, showing design 52 seen against non-perforated additional backing layer 44 through holes 6. FIG. 3L illustrates the other side of the imaged assembly of FIG. 3D, being non-perforated additional backing layer 44. FIG. 3M shows the other side of the assembly of FIG. 3H after removal of composite liner 48, being the reverse "ghost" image 58 and holes 7 through all layers of the assembly. Elevations of the other side of FIGS. 3G and 3H would be similar to FIGS. 3L and 3M before and after removal of the liner, in this case replacement liner 46.

Figure 4A:
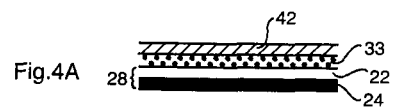
Figure 4B:
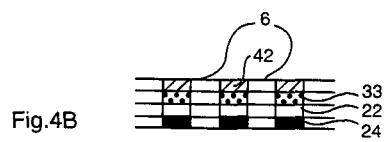
Figure 4C:
Figure 4D:
Figure 4E:
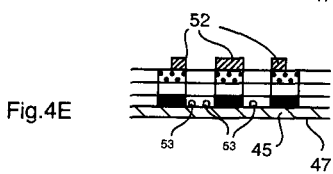
Figure 4F:
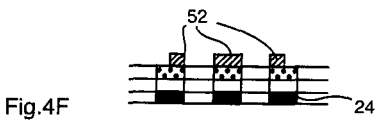
Figure 4H:
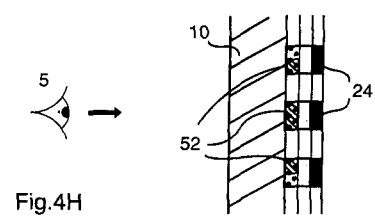
Figure 4J:
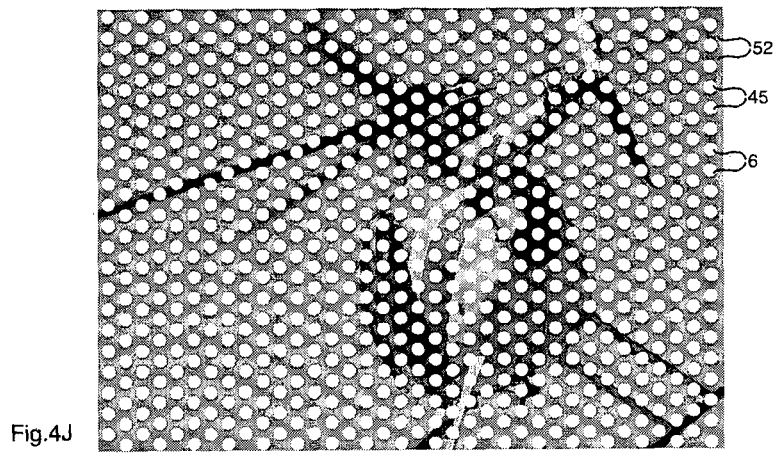
FIGS. 4J-4M are diagrammatic elevations of PRIOR ART perforated assemblies comprising a non-perforated layer.

FIGS. 4A-4H illustrate another prior art method of making a one-way vision assembly for inside application to a window. In FIG. 4A, film 28 comprises a white vinyl layer 22 laminated to a black vinyl layer 24 with a printable adhesive layer 33 and liner 42, all layers being perforated with holes 6 in FIG. 4B. A non-perforated backing layer 45 is applied to the perforated black vinyl layer 24 in FIG. 4C and perforated liner 42 is removed in FIG. 4D, to enable prior art inkjet printing with "low solvent" inkjet ink, the ink 53 that passes through holes 6 being deposited on the non-perforated backing layer 45 in FIG. 4E. The non-perforated backing layer 45 and ink 53 are subsequently removed in FIG. 4F. The adhesive, for example "gecko" adhesive of SignsCal, China, enables the imaged assembly to be adhered to the inside of window 10 in FIG. 4H, in which the design 52 is visible to an observer 5 outside the window but good through vision from inside the window is enabled through the holes 6 in the black vinyl layer 24. FIG. 4J is an elevation of the printed side of the imaged assembly of FIG. 4E but encompassing more perforations, showing design 52 seen against non-perforated additional backing layer 45 through holes 6.

Figure 4K:
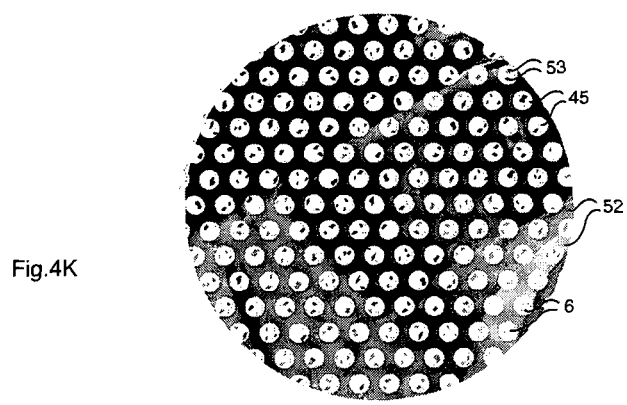
Figure 4L:
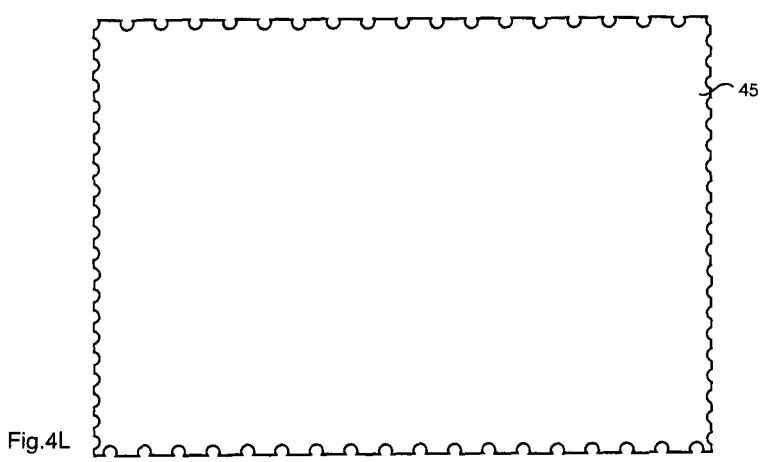
Figure 4M:
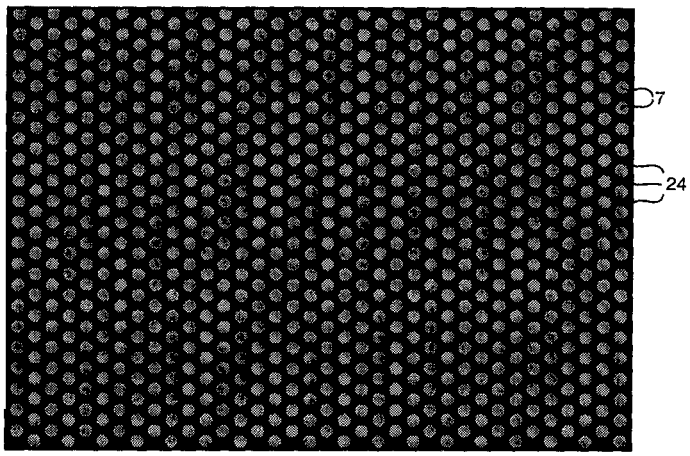

FIG. 4K is a close-up of FIG. 4J showing that excess ink 53 that passes through holes 6 onto non-perforated backing layer 45 coalesces into small deposits of ink 53 revealing the majority of non-perforated backing layer 45. FIG. 4L illustrates the other side of the imaged assembly of FIG. 4E, being non-perforated additional backing layer 45. FIG. 4M shows the other side of the assembly of FIG. 4H after removal of composite liner 48. Through holes 7 in FIG. 4M allow good through vision, light-absorbing layer 24 not reflecting substantial light to detract from such through vision.

Figure 5A:
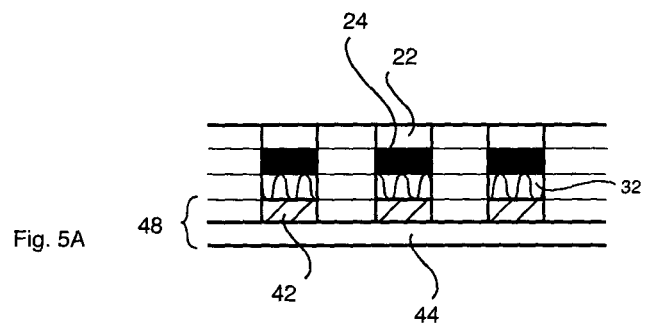
FIGS. 5A-5C are diagrammatic cross-sections through stages of production of PRIOR ART perforated assemblies comprising a non-perforated layer.
Figure 5B:
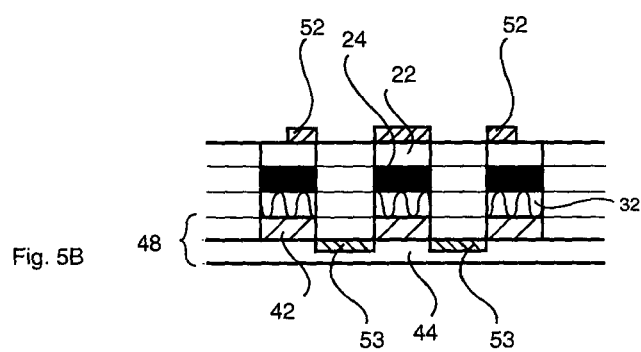
Figure 5C:
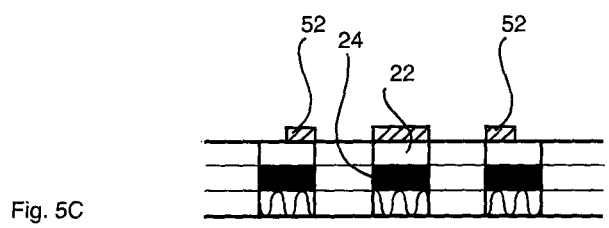
Figure 5D:
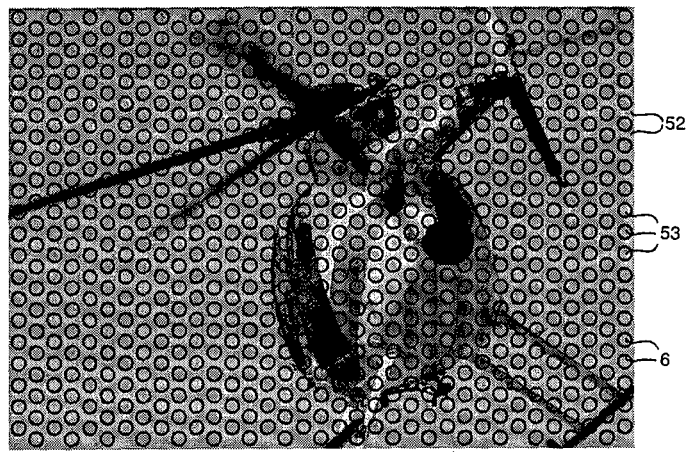
FIGS. 5D-5F are diagrammatic elevations of PRIOR ART perforated assemblies comprising a non-perforated layer.
Figure 5E:
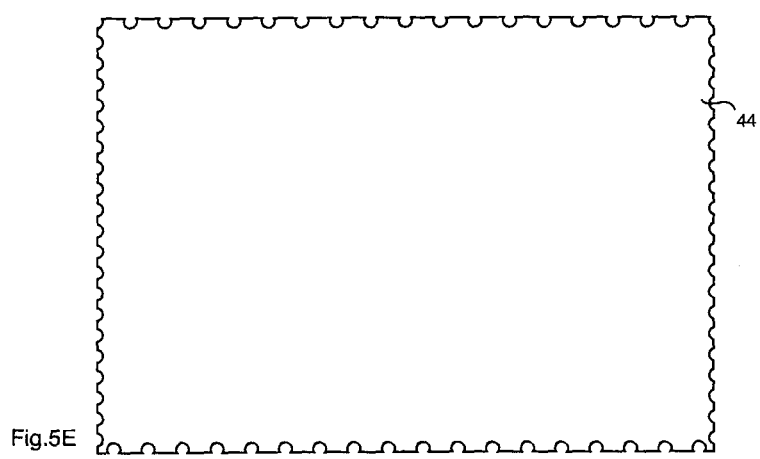
Figure 5F:
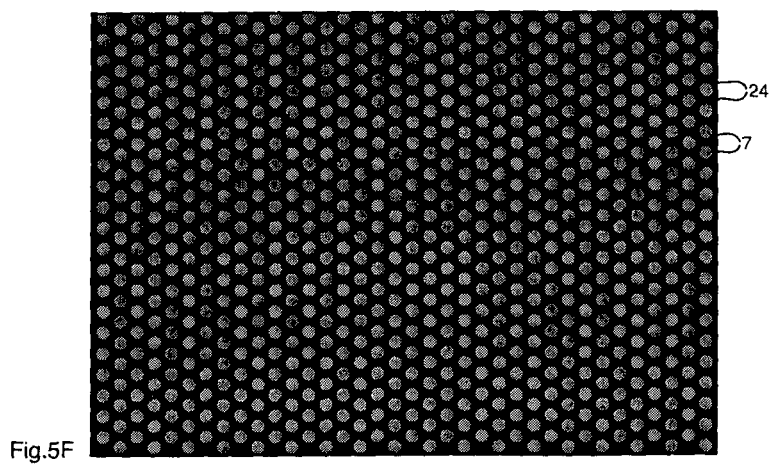

FIGS. 5A-5C are similar to FIGS. 1C, 1D and 1H, except the imaging system is solvent inkjet printing. Liner 42 is typically of paper to enable perforation of the assembly but this means that fibrous, absorbent edges to each hole are exposed to the atmosphere, leading to moisture absorption or drying, depending on the moisture content of the paper and atmospheric conditions, causing curling or so-called "lay flat" problems of the assembly of FIG. 5A. Design 52 is applied by solvent inkjet printing in FIG. 5B with ink 53 that passes through the holes being caught on the non-perforated additional backing layer 44, where it is sheltered to some extent from the typical hot air drying/curing regime and is typically at least partially absorbed into the fibrous exposed edges of perforated liner 42, which can exacerbate the "lay flat" problems of this "additional liner" construction, prior to removal of the composite liner 48 and excess ink 53 in FIG. 5C, typically on site. Another problem with this construction is that between imaging in FIG. 5B and removal of the liner on site in FIG. 5C, the solvents from the partly cured ink 53 may continue to be released into the atmosphere, causing unpleasant conditions and possibly unhealthy conditions in the print shop and an applicator's vehicle in transit to the site where the imaged assembly is to be applied to a window. FIG. 5D is an elevation of the printed side of the imaged assembly of FIG. 5B but encompassing more perforations, showing design 52 visible in holes 6 as well as on the solid portions of film 22. FIG. 5E illustrates the other side of the imaged assembly of FIG. 5B, being non-perforated additional backing layer 44. FIG. 5F shows the other side of the assembly of FIG. 5C after removal of composite liner 48. Unwanted ink 53 is removed with composite liner 48 and holes 7 in FIG. 5F allow good through vision, light-absorbing layer 24 not reflecting substantial light to detract from such through vision.

Figure 6A:
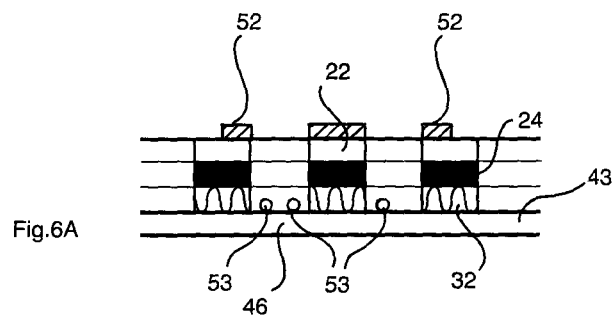
FIGS. 6A and 6C are diagrammatic cross-sections through stages of production of PRIOR ART perforated assemblies comprising a non-perforated layer.
Figure 6B:
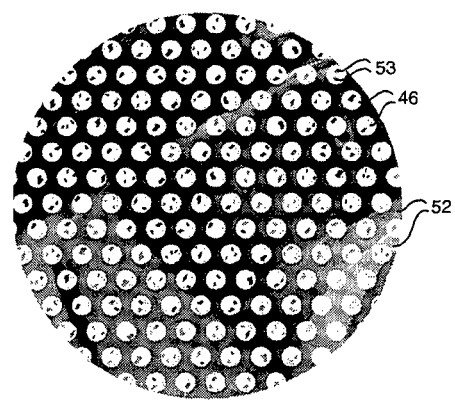
FIGS. 6B and 6D-6F are diagrammatic elevations of PRIOR ART perforated assemblies comprising a non-perforated layer.
Figure 6C:
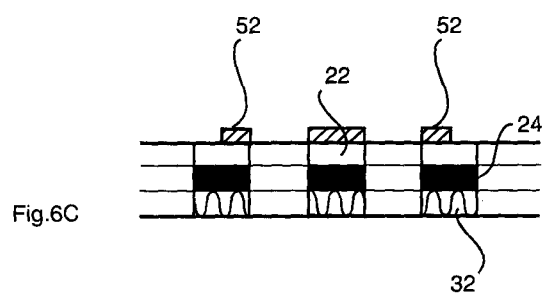
Figure 6D:
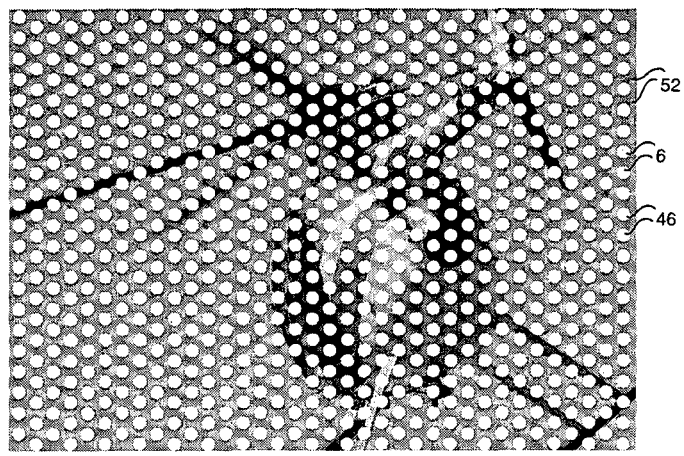
Figure 6E:
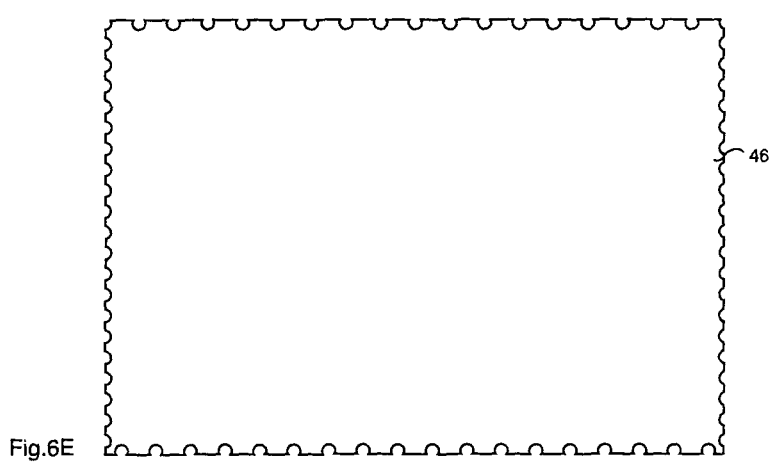
Figure 6F:
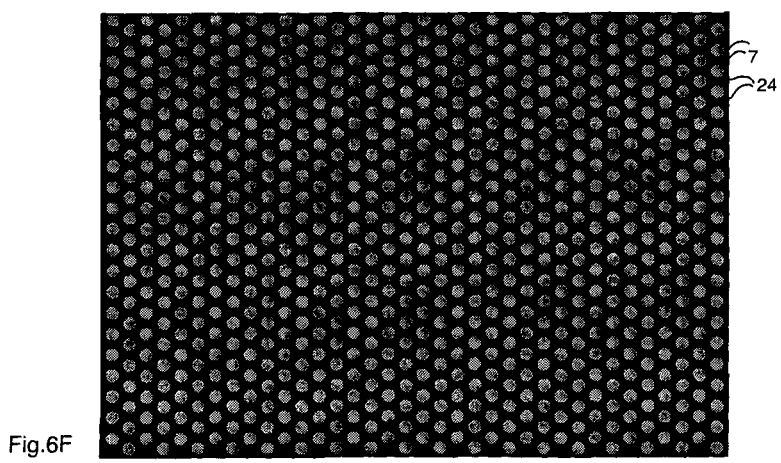

However, the conventional replacement liner construction also has problems as illustrated in FIGS. 6A-6C. FIG. 6A illustrates a conventional replacement liner construction comprising replacement liner 46 typically comprising a silicone release surface, imaged with design 52 by solvent inkjet printing. Solvent inkjet ink 53 that passes through the holes is deposited on the release surface of replacement liner 46 where it typically coalesces into globules which dry as small areas of solvent ink within each hole leaving the remainder of the replacement liner 43, typically white, visible around the inkjet ink 53, as illustrated in FIG. 6B. This visibility of a white liner 43 has the effect of making the image 52 appear paler than intended, typically causing a machine operative to apply more ink than is necessary. Such products may also be rejected by the client on receipt as the image appears paler than the intended artwork, which has typically been "proofed" and approved. Removal of replacement liner 46 also removes unwanted ink 53. FIG. 6D is an elevation of the printed side of the imaged assembly of FIG. 6A but encompassing more perforations, showing design 52 seen against replacement liner 46. FIG. 6E illustrates the other side of the imaged assembly of FIG. 6A, being non-perforated replacement liner 46. FIG. 6F shows the other side of the assembly of FIG. 6C after removal of the replacement liner 46. Through holes 7 in FIG. 6F allow good through vision, light-absorbing layer 24 not reflecting substantial light to detract from such through vision.

Figure 6G:
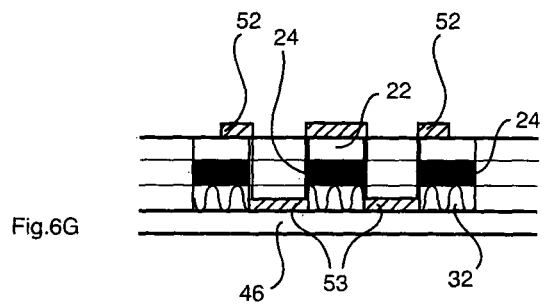
FIGS. 6G and 6H are diagrammatic cross-sections through stages of production of PRIOR ART perforated assemblies comprising a non-perforated layer.
Figure 6H:
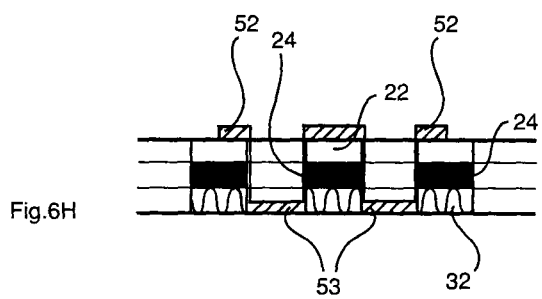
Figure 6J:
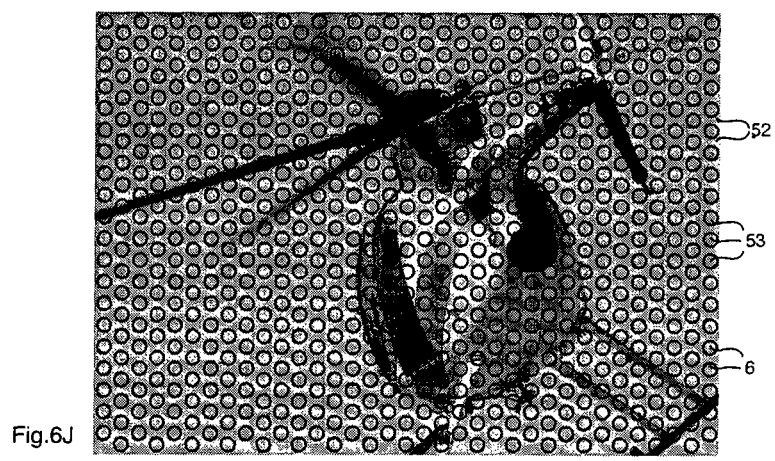
FIGS. 6J-6L are diagrammatic elevations of PRIOR ART perforated assemblies comprising a non-perforated layer.
Figure 6K:
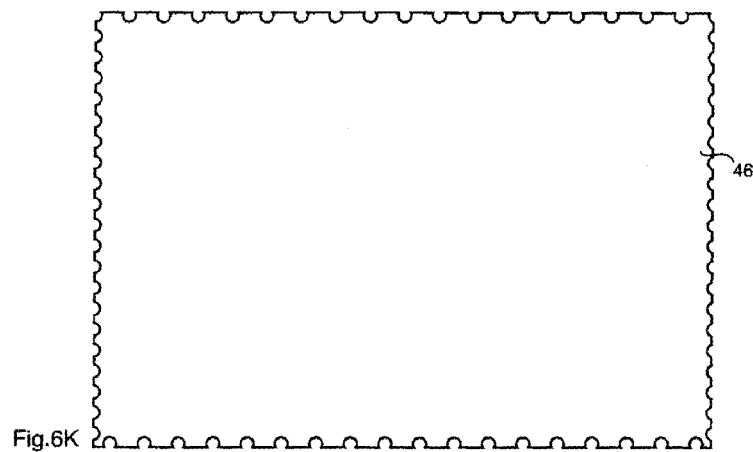
Figure 6L:
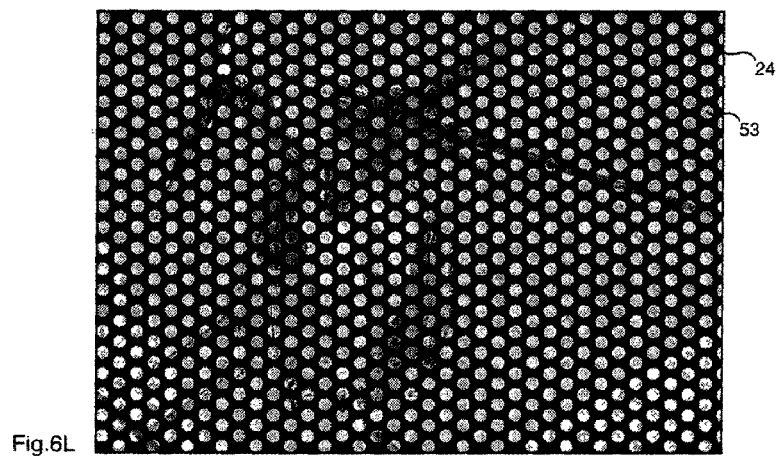

FIGS. 6G and 6H show a different problem, concerning the imaging of a prior art replacement liner construction with UV inkjet ink. UV ink undergoes chemical cross-linking when cured, providing substantial in-plane strength. When applied in sufficient quantities of ink, for example in dark areas of a design, upon removal of replacement liner 46, the ink 53 in the holes is typically not removed with the liner but spans across the holes, causing obstruction to through-vision, as shown in FIGS. 6H and 6J. It is for this reason that additional liner construction is typically used in the prior art printing of UV ink, as the unwanted UV ink 53 is strongly bonded to the exposed fibrous edges of perforated liner 42, which causes the unwanted ink 53 to be removed along with the composite liner 48. However, as already discussed, the additional liner construction has other problems, specifically lack of reliability of adhesion, owing to the distortion of the adhesive layer during the perforation process, and curling caused by moisture or solvent ingress or egress from the perforated liner 42. FIG. 6K illustrates the other side of the imaged assembly of FIG. 6G, being non-perforated replacement liner 46. FIG. 6L shows the other side of the assembly of FIG. 6H after removal of replacement liner 46, being light-absorbing layer 24, typically black, with a modified reverse image of design 52 in the hole areas.

These prior art assembles are not "WYSIWYG" (what you see is what you get) upon removal of the perforated liner, either before or after imaging the design 52. Rather, these conventional assemblies provide a visual impression from both sides, both before and after printing that can have a negative reaction from printer and customer alike.

One or more embodiments of the present invention overcomes various of these problems.

Figure 7A:
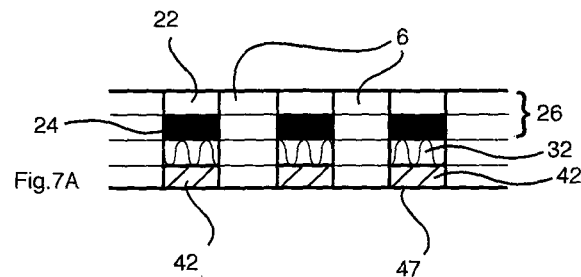
FIGS. 7A-7C are diagrammatic cross-sections through stages of production of open perforated self-adhesive assemblies according to one or more embodiments of the present invention.
Figure 7B:
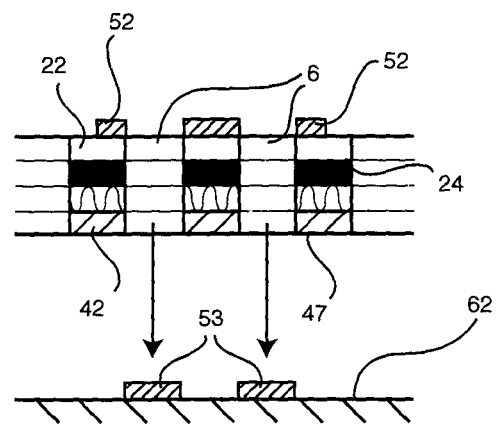

The open perforated assembly of FIG. 7A is manufactured by perforating a self-adhesive assembly comprising a film layer 26, an adhesive layer 32 and a liner 42. The perforated film 26 typically comprises a white film 22 and a light absorbing film or coating 24, typically black, the film or films, for example, being PVC and/or polyester and/or polyolefin. The perforated adhesive layer 32 is, for example, a solvent, acrylic-based pressure-sensitive adhesive, typically clear. The perforated liner 42 is, for example, a perforated silicone-coated paper liner. In FIG. 7B, the white film layer 22 on one side of the assembly is imaged with design 52, for example by screen printing or a digital inkjet press, to form a one-way vision panel, typically for external application to a window. The black layer 24 is to provide the good see-through vision following removal of the perforated liner 42 and application of the imaged perforated film 26 and perforated adhesive layer 32 to a transparent material 10, for example a window. Optionally, the assembly comprises a perforated white film 22, a perforated black adhesive layer 32 and a perforated liner 42. Optionally, perforated liner 42 is of a similar color to layer 24, typically black, such that if adhesive 32 is clear, the appearance of the assembly from the side of liner 42 is similar to the appearance of the assembly after removal of the liner 42, within an average color graytone variance of 30%, preferably 20% and more preferably within an average color graytone variance of 10%. Alternatively, perforated liner 42 is of one color, typically white paper, with a coating 47 of similar color to film layer 24 or adhesive layer 32, revealed after the removal of perforated liner 42, typically black. Whether the liner 42 is self-colored or comprises coating 47, the light transmissivity of the solid portions of the assembly and the assembly as a whole remains substantially unchanged before and after removal of the perforated liner 42, the light transmissivity being within a variance of 5% before and after removal of liner 42. In the case of this embodiment, the color of the solid portions of the assembly are within a graytone range of 70% to 100% before and after removal of liner 42, preferably within a graytone range of 80% to 100% and more preferably 90% to 100%. It should be understood that, according to one or more embodiments, any through vision from the other side of an open perforated assembly is preferable to the blocking of through vision by a non-perforated layer in prior art assemblies, for example in order to assess the product immediately following printing. Also, it should be understood that while the color black is normally preferred to be visible from the other side according to one or more embodiments, to minimise reflection and thereby assist vision through the perforation holes, any graytone will be preferable to a white perforated liner in an open perforated assembly according to one or more embodiments. According to one or more embodiments, the perforated liner 42 is optionally self-colored, for example any graytone within the range of 50%-100% (black) or more preferably within the range 70% to 100%. As another example, a white paper is partially imaged with black ink on the other side to achieve a gray visual effect or is imaged black on the other side, both sides optionally being subsequently coated, for example with polyethylene (PE), the one side then coated with a release layer, for example silicone.

It should also be understood that the open holes enable a realistic impression of the imaged assembly in use, immediately following, printing, when viewed from the one, imaged side, allowing the background to be visible, unlike the prior art imaged assemblies with a non-perforated layer.

FIG. 7B illustrates the assembly of FIG. 7A being imaged, typically by inkjet printing, the ink 53 passing through the holes 6 and shown diagrammatically being deposited on ink receiving surface 62 under holes 6. Receiving surface 62 is, for example, a disposable material 62 in gutter 72, for example blotting paper 62 in PRIOR ART FIG. 17A used in the prior art for printing fabrics. The surface 62 is separate from the assembly, and at least portions of the surface 62 are spaced from the assembly. Thus little or no unwanted, uncured ink is retained on the imaged assembly and unwanted ink 53 can be disposed of in an environmentally friendly fashion at the print shop, which is typically not done on site if retained on a non-perforated additional backing layer or replacement liner in the prior art constructions. The ink receiving surface is optionally part of a roll to roll ink removal system being transported along the length of a valley gutter or conventional platen, to avoid the need to remove individual sheets with interruption to the work flow.

Figure 7C:
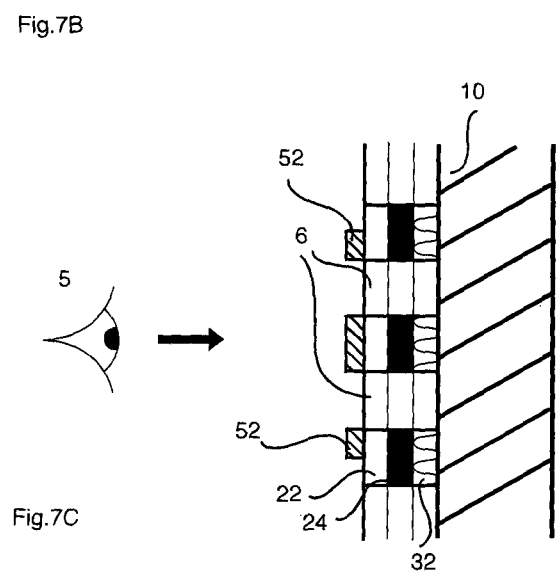

FIG. 7C shows the imaged assembly applied to transparent base material 10, typically a window, following removal of perforated liner 42. Observer 5 can see design 52 from outside the window while good visibility is provided through holes 6 from inside the window through black layer 24.

The open perforated assembly of FIG. 7A with a black perforated liner 42 or a black coating 47 can be termed "WYSIWYG-ALR" (what you see is what you get—after liner removal).

The imaged assembly of FIG. 7B with a black perforated liner 42 or a black coating 47 can be termed WYSIWYG-WATAW (what you see is what you get—when applied to a window).

Figure 7D:
FIGS. 7D-7F are diagrammatic elevations of open perforated self-adhesive assemblies according to one or more embodiments of the present invention.
Figure 7E:
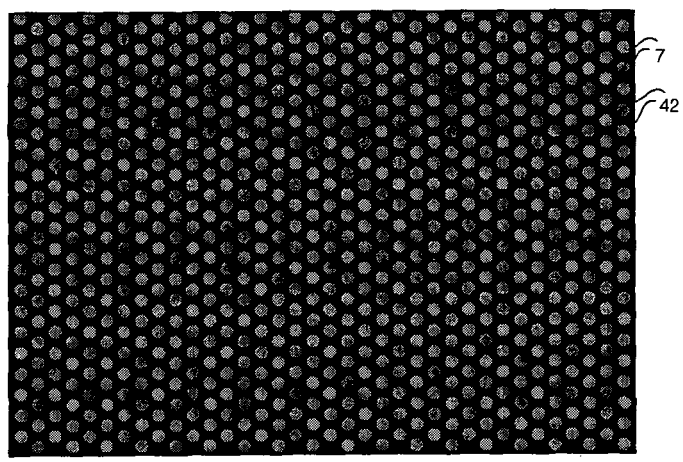
Figure 7F:
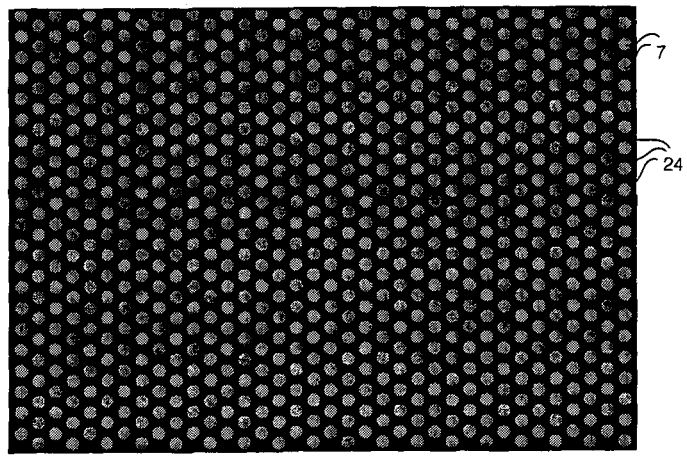

FIG. 7D is an elevation of the printed side of the imaged assembly of FIG. 7B before or after application to a window in FIG. 7C, the background 7 being visible through open holes 6 in either case. When viewed from the other side, the background 7 is visible through open through holes 6 in FIG. 7E before removal of liner 42, and in FIG. 7F, after removal of liner 42 and application to a window. One or more embodiments of the invention allows appraisal of the effectiveness of the see-through graphic immediately following printing and upon delivery to the customer, both significant advantages over the prior art. Thus the open perforated self-adhesive assembly of FIG. 7A is advantageous compared to one or more prior art constructions, as is its method of imaging, previously reserved for open weave fabric or mesh material. Furthermore, the resultant imaged open perforated self-adhesive assembly according to one or more embodiments has another significant advantage over the prior art, insofar as it comprises a viable one-way vision product prior to removal of the liner and application to a window, for example it could be used as a hanging banner or be applied to a window by discrete means, for example by self-adhesive tabs or suction devices. It is known that self-adhesive (sometimes referred to pressure-sensitive adhesive) is not liked by many retail establishments and other building owners or tenants, typically through having experienced "adhesive transfer" to a window upon removal of a self-adhesive graphic of poor construction. This construction is primarily intended to be applied to the outside of a window but some retailers and other building owners prefer advertisements to be applied to the inside of a window. An imaged assembly, a Point of Purchase advertisement for example, of one or more embodiments of the present invention delivered to site, for example a retail establishment, can be used as a self-adhesive graphic on the outside of a window or, alternatively, for example, as a banner or advertisement applied by discrete means to the outside or inside of a window. The choice of self-adhesive application outside a window or inside installation behind a window, in either case having a light-absorbing surface facing inwards, is an advantage of one or more embodiments of the present invention compared to the prior art assemblies.

While perforated liner 42 preferably appears of similar color to that same side of the assembly after its removal, another color of perforated liner 42 according to one or more embodiments of the invention is still advantageous to the prior art and inkjet printing of an assembly comprising a non-perforated layer, as when placed against a window the background interior space is visible from the outside giving a realistic impression of the design side of the assembly after application to a window, as in FIGS. 7C and 7D, which can be termed WYSIWYG-DS (what you see is what you get—design side). In inkjet printing, the ink receiving surface 62 is preferably remote from the other side of the open perforated assembly to that which is being imaged, as illustrated in FIG. 7B. However, optionally, the ink receiving surface 62 can be adjacent to the other side of the open perforated assembly. An advantage of a perforated liner that is black or coated black means that any CMYK inks, which are typically translucent, which are smeared or otherwise applied to the black surface, are typically not obviously visible and do not prejudice the WYSIWYG-WATAW nature of the imaged open perforated assembly. While inkjet printing machines with an open gutter are typically preferred in one or more embodiments of the invention, other inkjet machines can be adapted for printing open perforated assemblies, for example by the application of sacrificial self-adhesive tape over a printing platen with or without holes for a partial vacuum suction device intended to temporarily hold non-perforated substrates in place or an ink receiving surface comprising a filmic or paper layer that is moved along a platen to receive and transport unwanted ink that passes through the perforation holes. The design 52 is typically a multi-color process design, for example comprising deposits of CMYK (cyan, magenta, yellow and black) process inkjet inks. The perforated film 28 can be imaged, for example, by solvent-based inkjet ink or by UV-curable inkjet ink or by latex inkjet ink, for example from Hewlett Packard, CA, USA, or water-based inkjet ink. One or more embodiments of the present invention illustrated in FIGS. 7A to 7C have been reduced to practice by printing with UV curable ink on a HP Scitex XP2100 UV inkjet machine from Hewlett Packard, CA, USA. As expected no UV cured ink bridged any of the perforation holes. It has also been reduced to practice by printing with latex ink on a HP Designjet L65500 inkjet machine from Hewlett Packard, CA, USA.

Figure 8A:
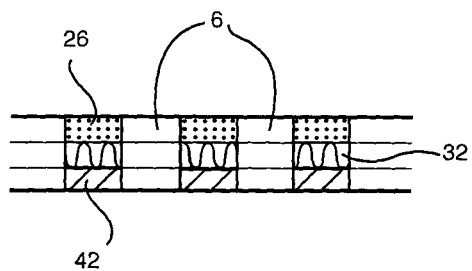
FIGS. 8A-8C are diagrammatic cross-sections through stages of production of open perforated self-adhesive assemblies according to one or more embodiments of the present invention.
Figure 8B:
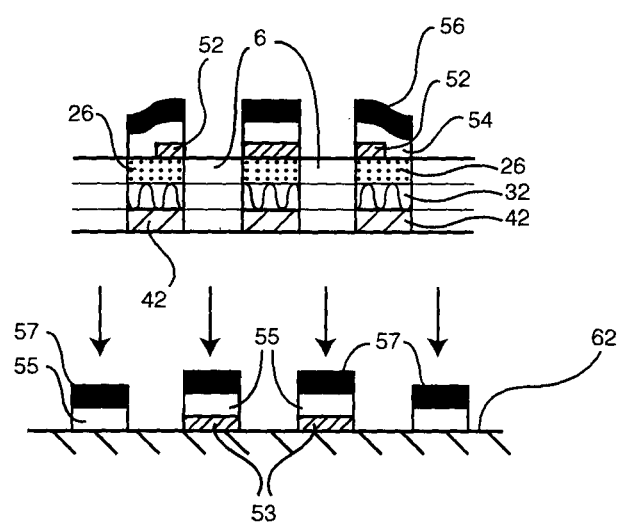

FIGS. 8A-8F illustrate another example of an open perforated adhesive assembly, which comprises a perforated water clear film 26, a perforated water clear pressure-sensitive adhesive layer 32 and a perforated liner 42, as illustrated in FIG. 8A, typically used for imaging and internal application to a window. The clear perforated film is typically printed with a reverse (mirror) image of the required design 52, followed by white and black layers, in order to create a one-way vision panel according to U.S. RE37,186, as illustrated in FIG. 8B, or with a translucent white layer, in order to create a vision control panel according to U.S. Pat. No. 6,212,805 that can be illuminated from the side remote from the design. The design and backing layers can be applied by any suitable imaging system, for example screen printing or digital inkjet printing or the design can be applied by digital inkjet printing and the backing layers applied by a different method, for example by screen printing or by thermal mass transfer, for example according to U.S. Pat. No. 6,872,435, for example using Contra Vision® TT™ from Contra Vision North America, Inc. GA, USA.

Figure 8C:
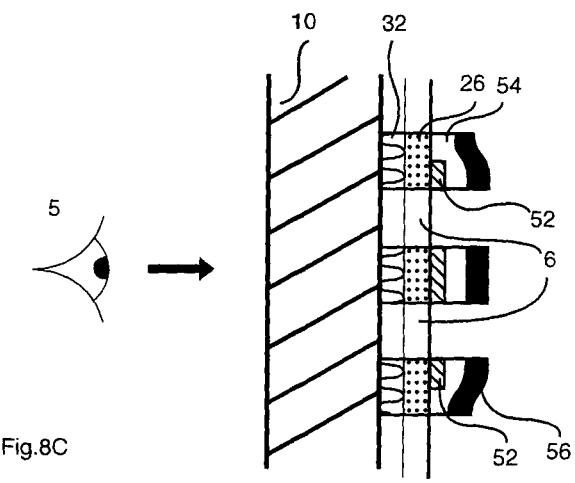
Figure 8D:
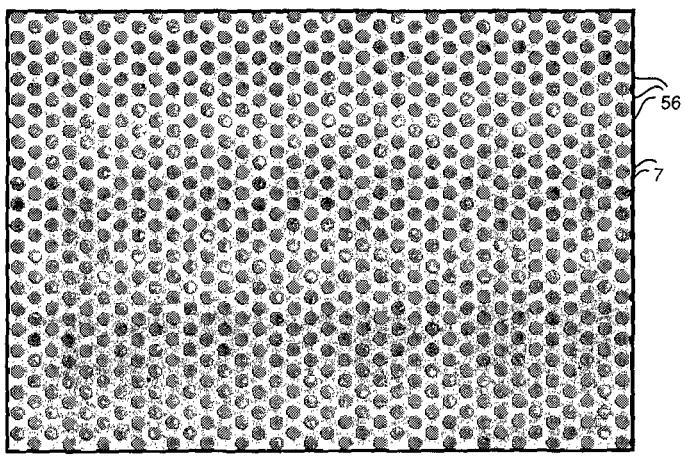
FIGS. 8D-8F are diagrammatic elevations of open perforated self-adhesive assemblies according to one or more embodiments of the present invention.
Figure 8E:
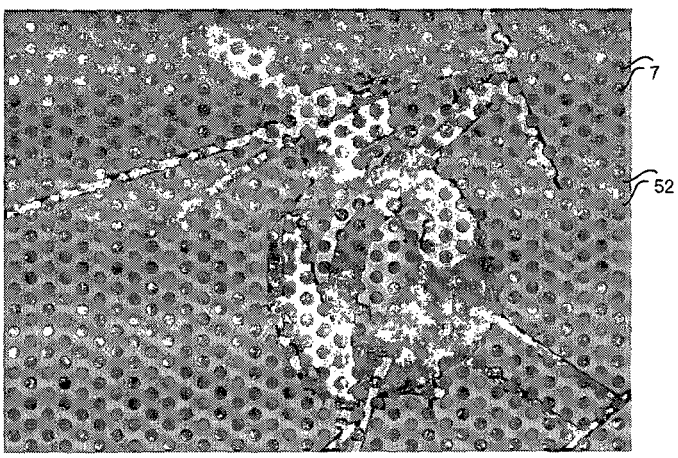
Figure 8F:
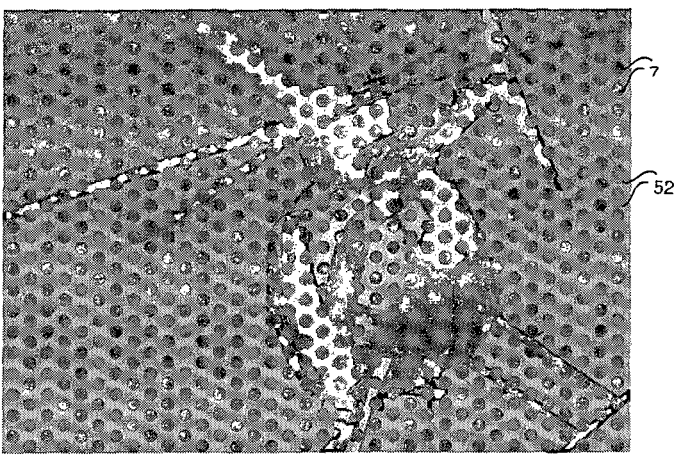

FIGS. 8A-8C are similar to FIGS. 7A-7C except that the face film 26 is transparent and the imaged assembly of FIG. 8B comprising reverse-printed design 52, white backing layer 54 and optional black backing layer 56 is intended to be applied to the inside of window 10 as shown in FIG. 8C. Ink passing through holes 6 in FIG. 8B, typically design ink 53, white ink 55 and black ink 57 are deposited on ink receiving surface 62. Optionally, perforated liner 42 is transparent such that the appearance of the assembly is substantially the same before and after removal of the liner 42 ("WYSIWYG-ALR" (what you see is what you get—after liner removal)) and the imaged assembly appears the same before and after application to a window (WYSIWYG-WATAW (what you see is what you get—when applied to a window)). The light transmissivity of the assembly is substantially unchanged after removal of a clear perforated liner 42, e.g., within a variance of 5% of light transmissivity. The variance in average color graytone of the solid portions when viewed from the perforated liner side within a given area of the assembly will be less than 30%, preferably less than 20% and more preferably less than 10%, before and after removal of the perforated liner 42. FIG. 8D is the elevation of the printed side of the assembly of FIG. 8B before or after application to a window, in FIG. 8C. Through holes 6 and light-absorbing layer 56, typically black, allow good through vision, typically from the inside of a window to background 7. FIGS. 8E and 8F show in elevation design 52 before and after removal of a water clear liner 42, respectively, the images being substantially identical. If perforated liner 42 is clear, the quality of printing of the image 52 can be checked right-reading against a white background, before applying layers 54 and 56. Alternatively, if perforated liner 42 is white, the quality of the reverse-printed design 52 can be assessed, albeit in reverse, before applying white backing layer 54.

Figure 9A:
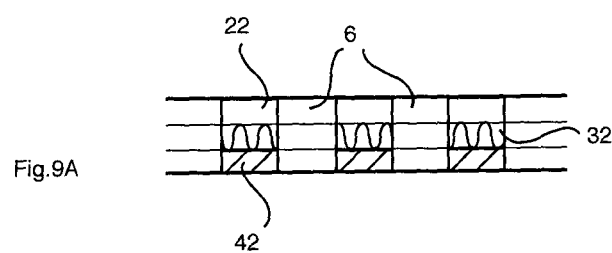
FIGS. 9A-9C are diagrammatic cross-sections through stages of production of open perforated self-adhesive assemblies according to one or more embodiments of the present invention.
Figure 9B:
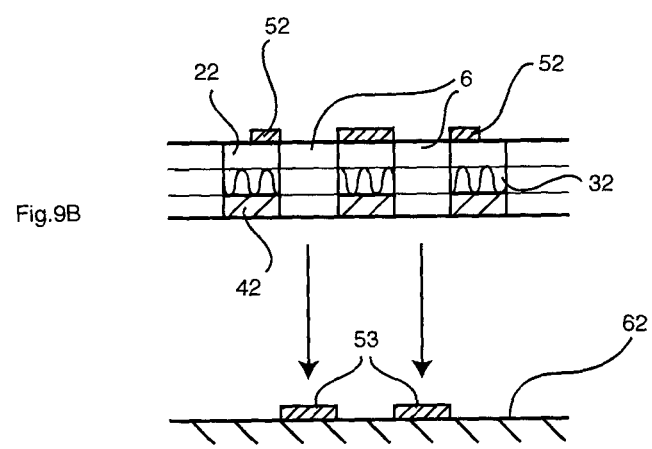
Figure 9C:
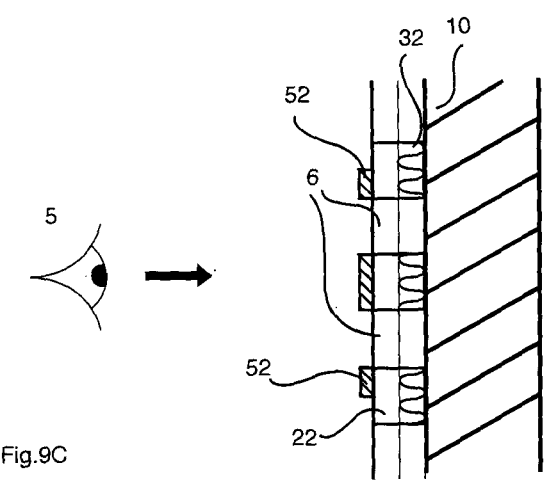

FIGS. 9A-9C are similar to FIGS. 7A-7C except that translucent white face film 22 is imaged with translucent design 52, for example by inkjet inks, as shown in FIG. 9B. The resultant see-through graphic or vision control panel is in accordance with U.S. Pat. No. 6,212,805, the design being visible to an observer 5 outside the window and capable of illumination from inside the window, so as to be visible during the hours of darkness. Optionally, perforated liner 42 is transparent to achieve WYSIWYG-ALR and WYSIWYG-WATAW performance characteristics. Alternatively, perforated liner 42 is white, providing WYSIWYG-DS performance, each of these options being advantageous over the prior art with a non-perforated layer. The light transmissivity of the assembly is substantially unchanged after removal of a clear perforated liner 42, e.g., within a variance of 5% of light transmissivity. According to various embodiments, the variance in average color graytone of the solid portions when viewed from the perforated liner side within a given area of the assembly will be less than 30%, preferably less than 20% and more preferably less than 10%, before and after removal of the perforated liner 42.

Figure 9D:
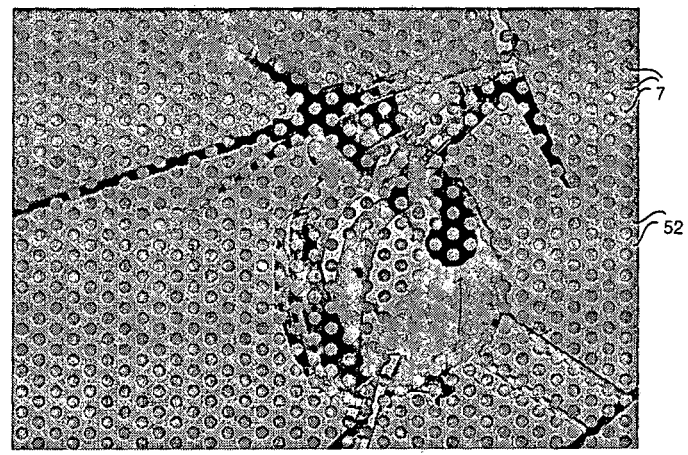
FIGS. 9D-9F are diagrammatic elevations of open perforated self-adhesive assemblies according to one or more embodiments of the present invention.
Figure 9E:
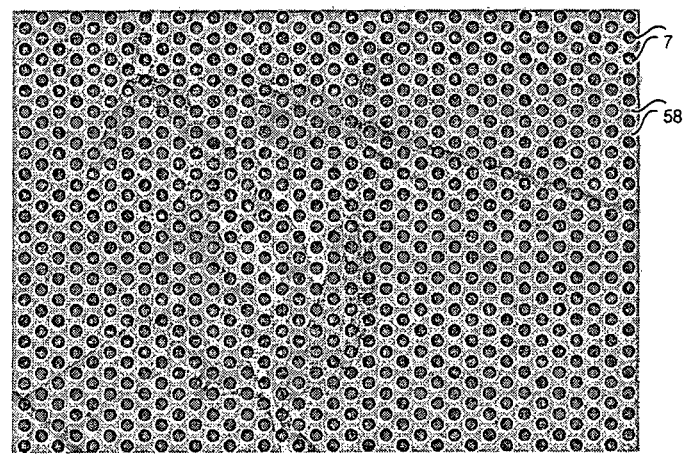
Figure 9F:
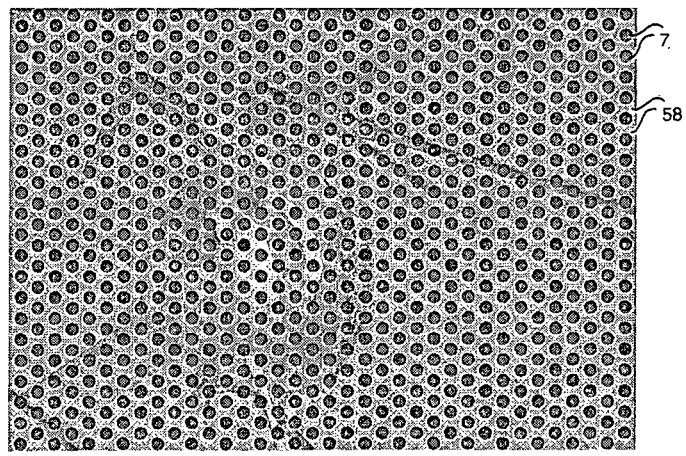

FIG. 9D is an elevation of the imaged assembly from the printed side. FIGS. 9E and 9F are substantially identical images from the other side before and after removal of a water clear perforated liner 42, for example a polyester film. From the other side a "ghost" reverse image 58 of design 52 is typically visible from the other side owing to the translucent nature of film 22. However, the holes 6 typically allow visibility of background 7, the brain of an observer being able to focus or concentrate on either the reverse image 58 or the background 7.

FIGS. 10A-10G are diagrammatic cross-sections through example perforated adhesive assemblies according to one or more embodiments of the invention using a printable adhesive layer, for example a printable foamed layer.

Figure 10H:
FIGS. 10H and 10J-10K are diagrammatic elevations of open perforated self-adhesive assemblies according to one or more embodiments of the present invention.
Figure 10J:
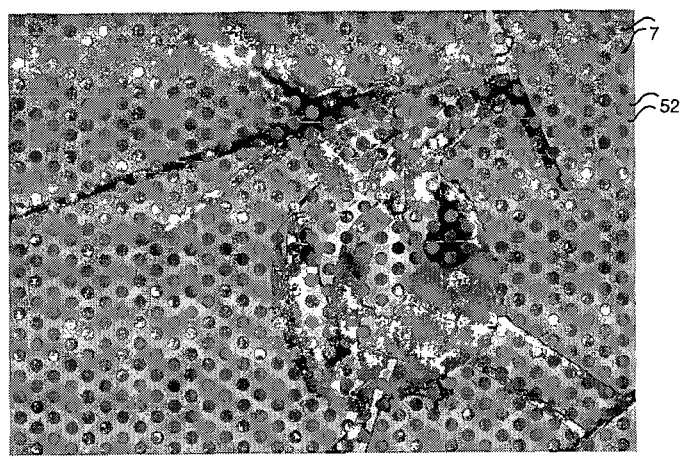
Figure 10K:
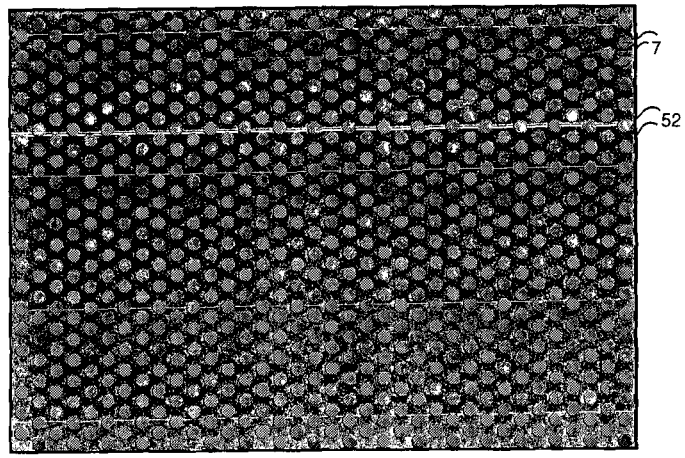

FIG. 10A illustrates film layer 28, comprising light-reflective layer 22 and light-absorbing layer 24, for example comprising white vinyl film 22 with black vinyl film or coating 24 with printable adhesive or foamed layer 33 and release liner 42, all perforated in FIG. 10B. If release liner 42 is a transparent clear material, the assembly is WYSIWYG-ALR. This is followed by the removal of perforated liner 42 to form an open perforated self-adhesive assembly in FIG. 10C. Optionally a non-perforated protective liner 48, preferably water clear, is applied to printable adhesive or foamed layer 33 for handling and transport, for example to a printshop, as illustrated in FIG. 10D. In FIG. 10E, the printable adhesive or foamed layer 33 is imaged with design 52, typically by digital inkjet printing, ink 53 passing through the holes 6 being deposited upon ink receiving surface 62, for example an open gutter or disposable material within an open gutter, for example blotting paper. The design 52 is shown diagrammatically to be at least partially absorbed within or contained within printable adhesive or foamed layer 33, to enable the adhesive layer or foamed layer 33 to be effective in adhering to window 10, as shown in FIG. 10G. The design 52 is visible to an observer 5 outside the window but good through-vision is enabled through holes 6 in black layer 24. Optionally, a reused or other protective liner 48 is applied to the printed assembly of FIG. 10E to protect the imaged printable adhesive or foamed layer 33, as shown in FIG. 1 OF, during subsequent handling, finishing and transport to site before removing the protective liner 48 for application of the imaged assembly to a transparent material 10, for example a window, as shown in FIG. 10G. FIG. 10H is an elevation of the imaged assembly of FIG. 10E or the protected imaged assembly of FIG. 10F. The removal of water clear protective liner 48 from the assembly of FIG. 10F does not substantially affect the perceived image of the design 52, as shown in FIG. 10J. FIG. 10K illustrates the other side of the assembly in which light absorbing layer 24 allows good vision of background 7 through holes 6 in the assemblies of FIGS. 10E, 10F and 10G.

It should be understood that the descriptions of the embodiments are by example only. For example layers 22 and 24 can be of different material, for example paper, and of different color, for example light-reflective layer 22 can be of metallic appearance, for example metallic silver or gold. Film layers can alternatively be coatings, for example layer 24 can be a black ink coating on a white vinyl film 22, or layer 22 can be a white clay coating on a black paper 24. It should be understood that instead of a window, transparent material 10 can be any transparent panel, for example a glass door, a glass partition, a glass balustrade, an acrylic, polycarbonate, PVC or any other transparent plastic panel.

Figure 11A:
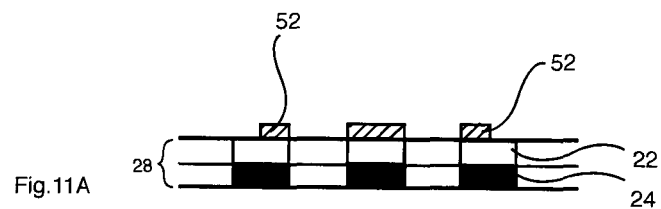
FIGS. 11A-11D are diagrammatic cross-sections through stages of production of open perforated self-adhesive assemblies according to one or more embodiments of the present invention.
Figure 11B:
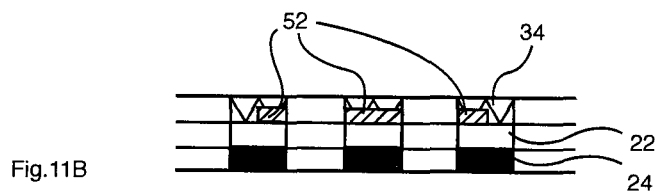
Figure 11C:
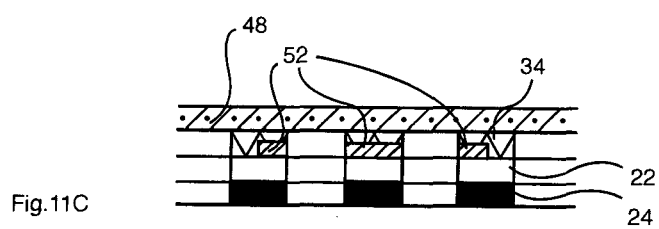
Figure 11D:
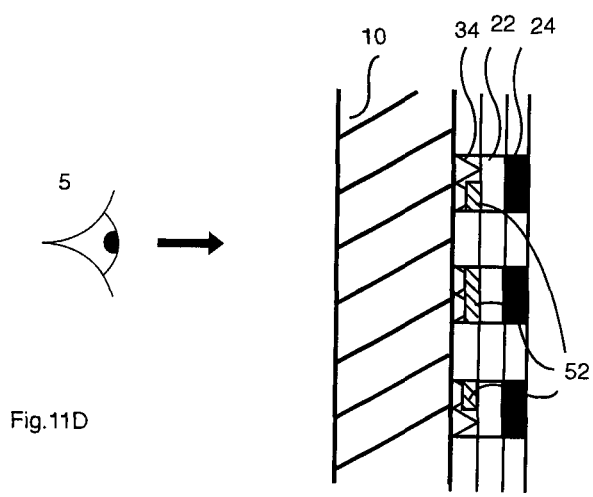
Figure 11E:
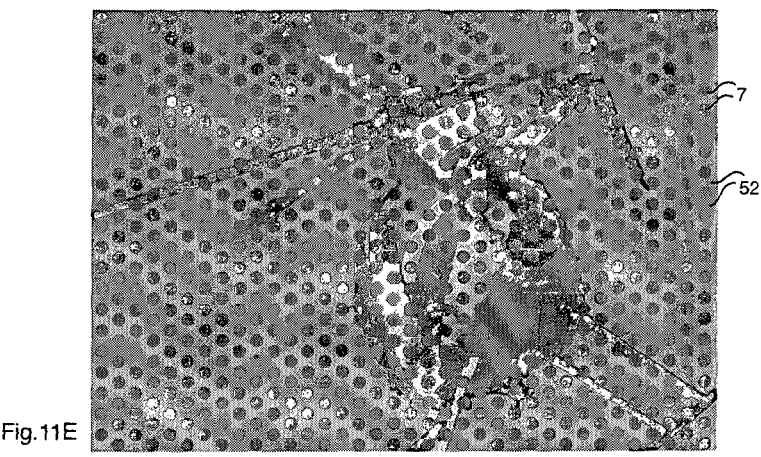
FIGS. 11E-11G are diagrammatic elevations of open perforated self-adhesive assemblies according to one or more embodiments of the present invention.
Figure 11F:
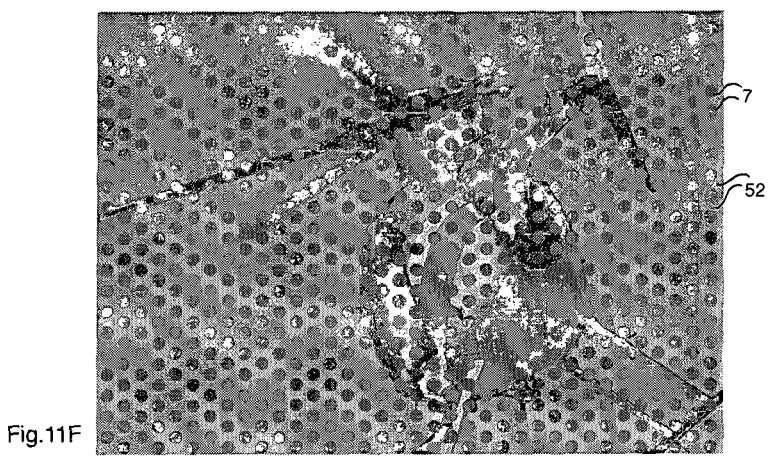
Figure 11G:
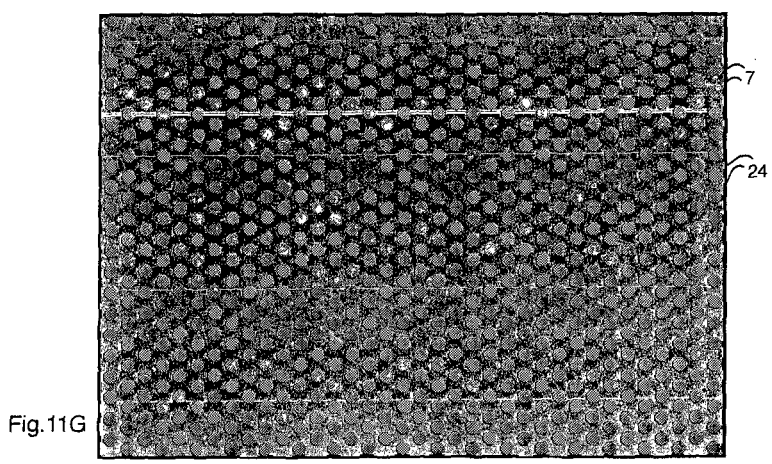

FIGS. 11A-11C illustrate an alternative sequence according to one or more embodiments of the invention for applying an imaged open perforated assembly, as shown in FIG. 11A to the inside of a window, by means of adhesive layer 34 applied to the imaged assembly of FIG. 11A, for example by spraying, screen printing or thermal transfer of the adhesive 34, as shown in FIG. 11B. Typically, protective liner 48 is applied to the surface of adhesive 34 for handling and transport to site, to be removed prior to application of the imaged assembly to transparent material 10, for example a window, as illustrated in FIG. 11D. FIG. 11E illustrates the imaged assembly as seen through water clear protective liner 48, shown to be substantially identical after its removal in FIG. 11F. From the other side of the assemblies of FIG. 11B, 11C or 11D, light absorbing, typically black, layer 24 allows good vision of background 7 through holes 6.

Figure 12A:
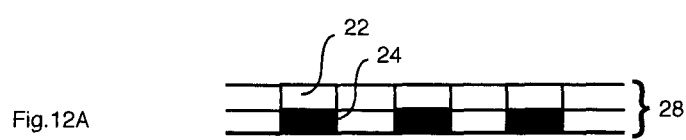
FIGS. 12A and 12B are diagrammatic cross-sections through stages of production of open perforated assemblies according to one or more embodiments of the present invention.
Figure 12B:
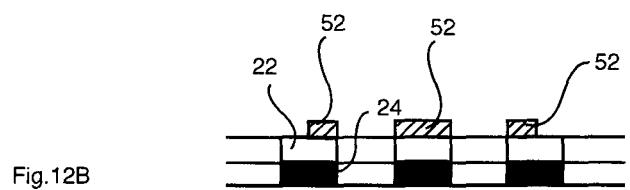
Figure 12C:
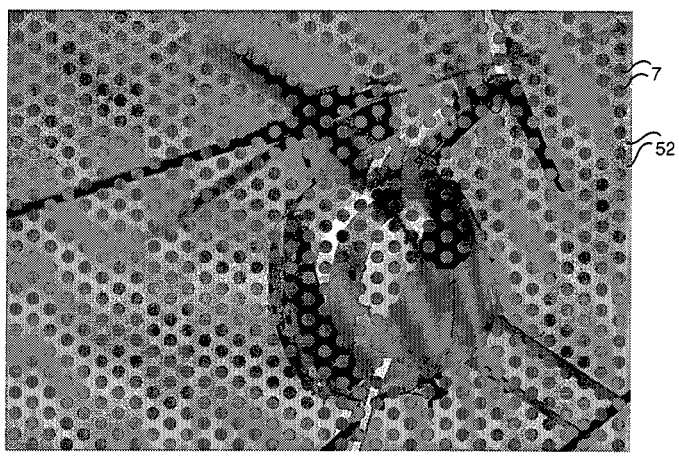
FIGS. 12C and 12D are diagrammatic elevations of open perforated self-adhesive assemblies according to one or more embodiments of the present invention.
Figure 12D:
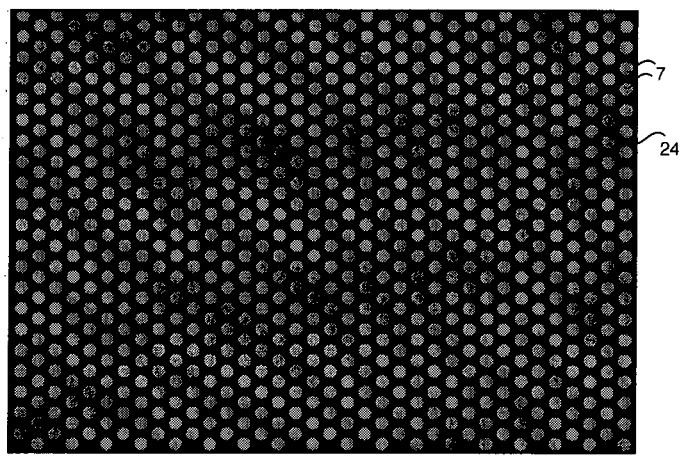

FIGS. 12A-15D show alternative open perforated assemblies which do not comprise an adhesive layer for application to another surface, for example to be used as see-through graphic banners or surrounding see-through graphics to building scaffolding. In FIG. 12A, the film assembly 28 comprising layers 22 and 24, for example of white vinyl and black vinyl respectively, has been imaged according to the method of one or more embodiments of the invention with design 52 to form the imaged open perforated assembly of FIG. 12B. FIGS. 12C and 12D are elevations on the imaged and reverse sides respectively.

Figure 13A:
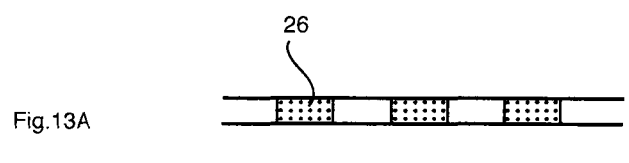
FIGS. 13A and 13B are diagrammatic cross-sections through stages of production of open perforated material according to one or more embodiments of the present invention.
Figure 13B:
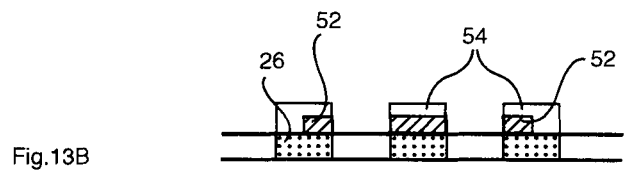
Figure 13C:
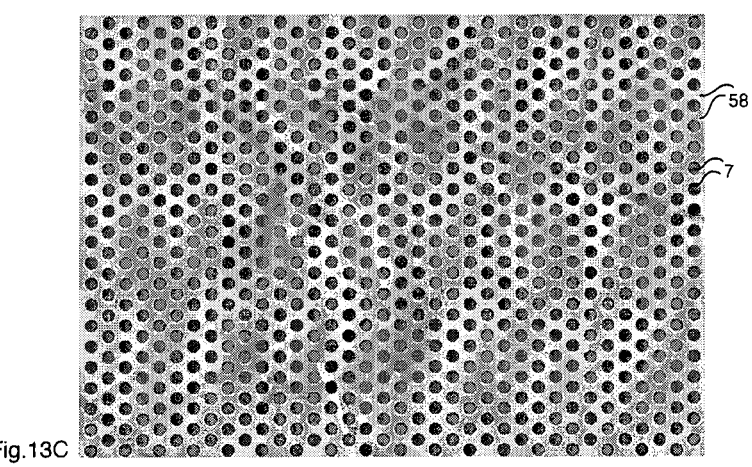
FIGS. 13C and 13D are diagrammatic elevations of open perforated material according to one or more embodiments of the present invention.
Figure 13D:
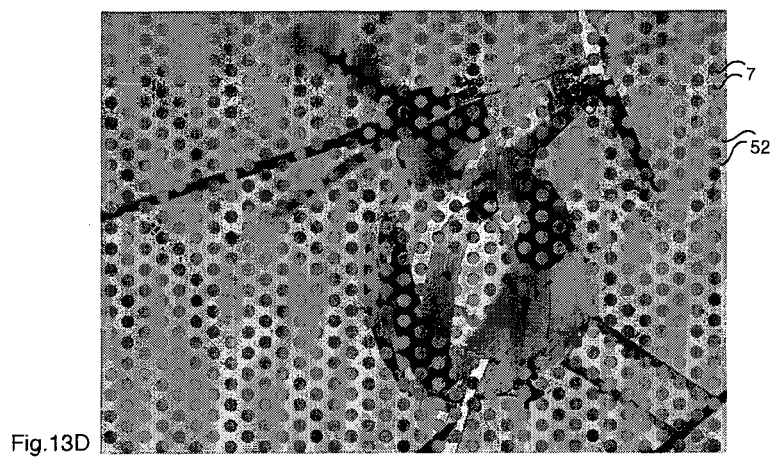

The water clear perforated film 26 of FIG. 13A has been imaged with design 52 and white backing layer 54 in FIG. 13B. FIG. 13C is an elevation of the printed side showing a reverse "ghost" image 58 of the design 52 visible through water clear perforated film 26 from the other side. FIG. 13D shows the design 52 of FIG. 13B visible through transparent film 26.

Figure 14A:
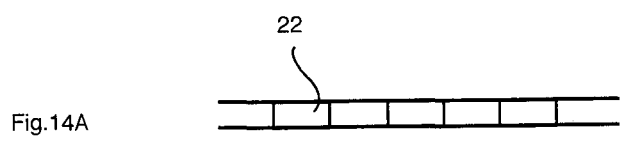
FIGS. 14A and 14B are diagrammatic cross-sections through stages of production of open perforated material according to one or more embodiments of the present invention.
Figure 14B:
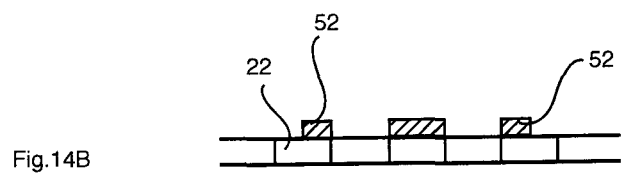
Figure 14C:
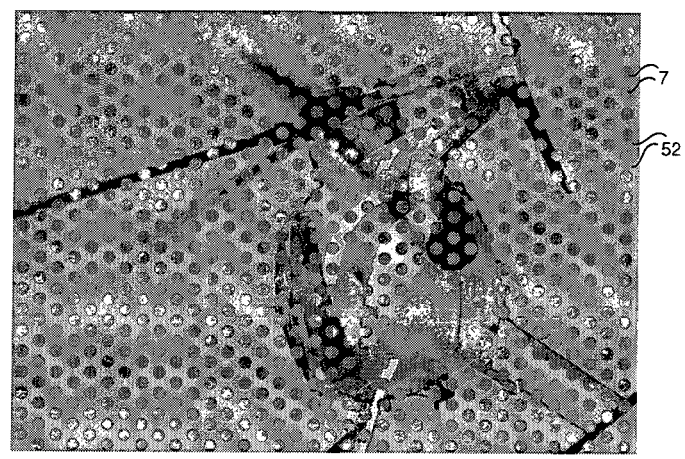
FIGS. 14C and 14D are diagrammatic elevations of open perforated assemblies according to one or more embodiments of the present invention.
Figure 14D:
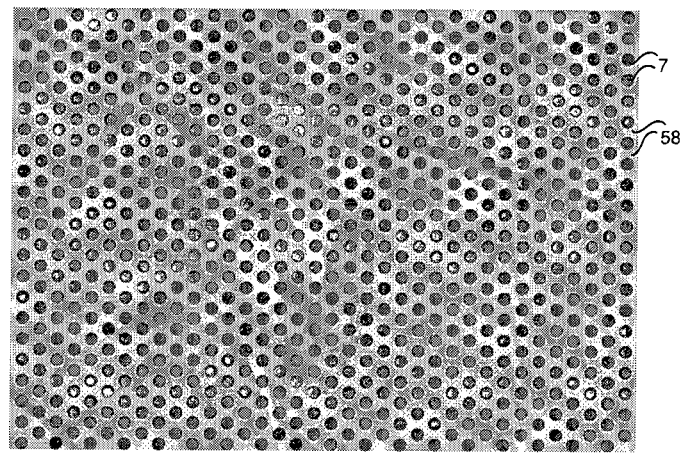

A perforated translucent white film 22 in FIG. 14A has been imaged with design 52 in FIG. 14B. FIG. 14C shows the imaged side and FIG. 14D the reverse "ghost" image 58 from the other side. The latter two examples of FIGS. 13B and 14B are panels according to U.S. Pat. No. 6,212,805 which can be illuminated from either side of the panel.

Figure 15A:
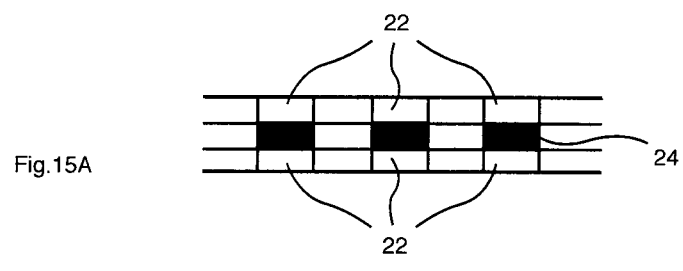
FIGS. 15A and 15B are diagrammatic cross-sections through stages of production according to one or more embodiments of open perforated assemblies of the present invention.
Figure 15B:
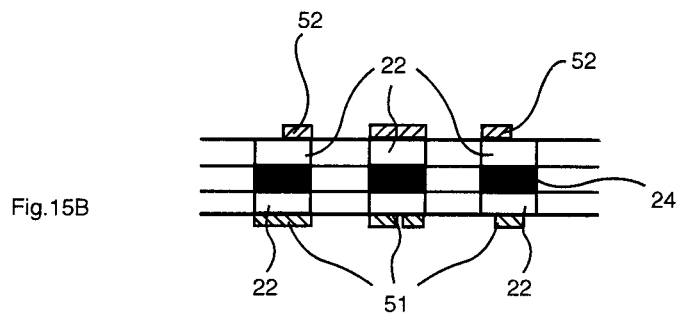
Figure 15C:
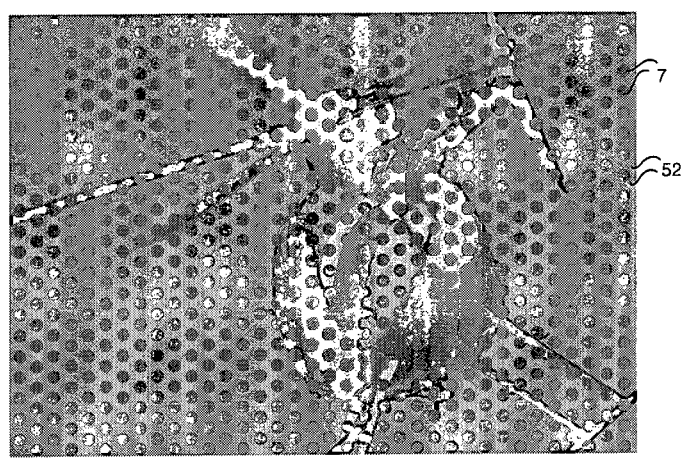
FIGS. 15C and 15D are diagrammatic elevations of open perforated assemblies according to one or more embodiments of the present invention.
Figure 15D:
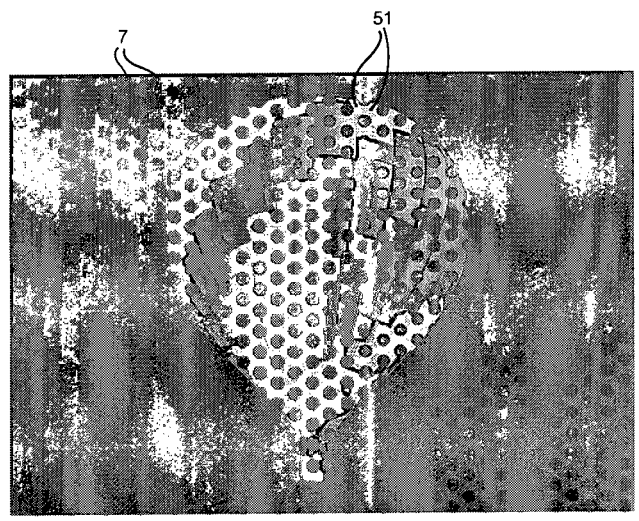

A perforated assembly of FIG. 15A comprises two imaging film layers 22, for example of white vinyl, separated by light-blocking (opaque) film layer or coating 24, typically black or silver, is optionally imaged with design 52 on one side and a different design 51 on the other side. The elevation of FIG. 15C illustrates design 52 on one side of the panel and the elevation of FIG. 15D illustrates different design 51 on the other side of the panel. Alternatively, design 51 can be similar to design 52, for example to provide a see-through banner with a right-reading design 52 visible from both sides of the banner.

Figure 16A:
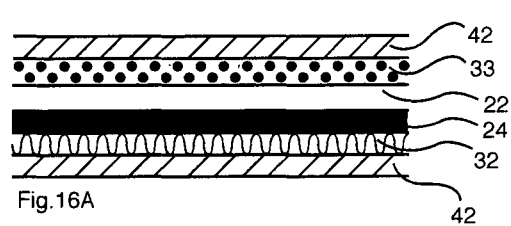
FIGS. 16A-16G are diagrammatic cross-sections through stages of production of open perforated assemblies according to one or more embodiments of the present invention.
Figure 16E:
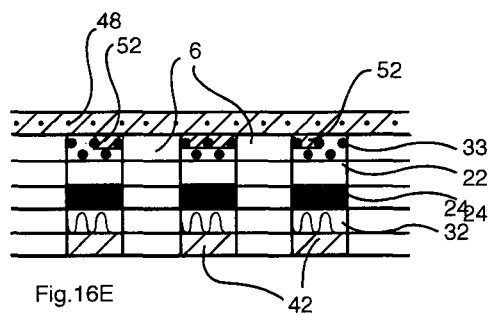
Figure 16B:
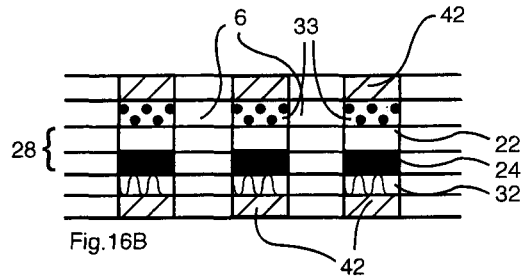
Figure 16C:
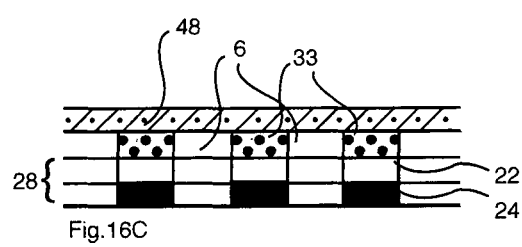
Figure 16F:
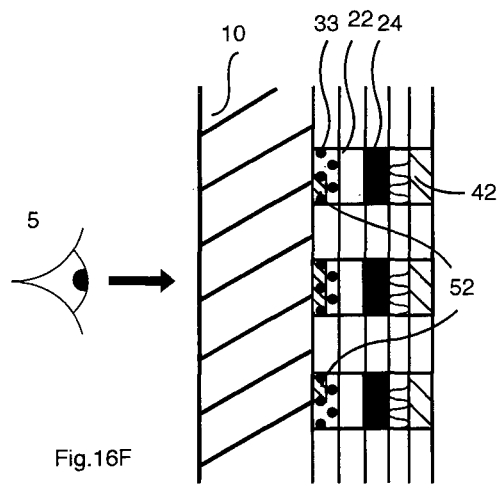
Figure 16D:
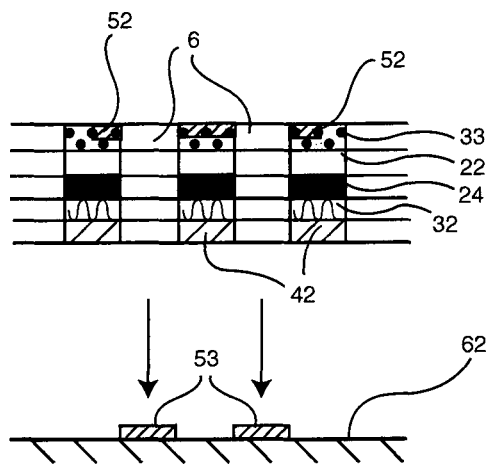
Figure 16G:
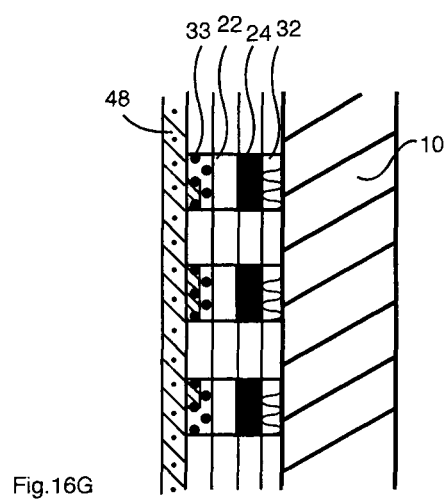
Figure 16H:
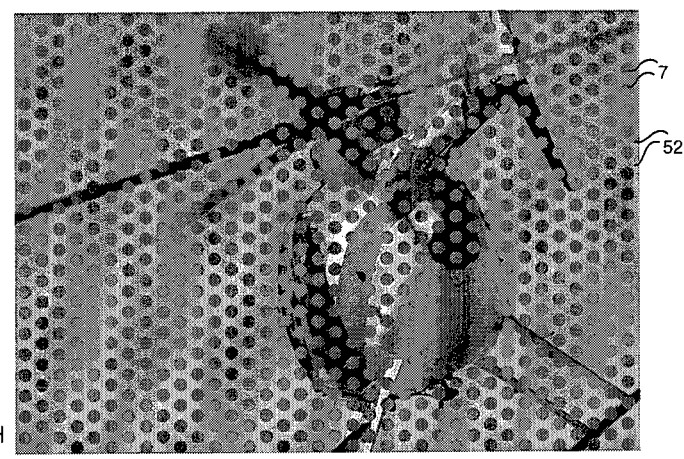
FIGS. 16H and 16J are diagrammatic elevations of open perforated assemblies according to one or more embodiments of the present invention.
Figure 16J:
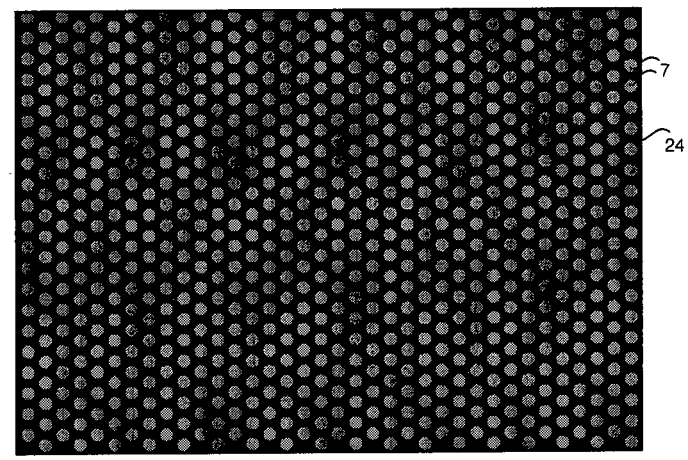

FIGS. 16A to 16J illustrate an embodiment of the invention which combines the various features of the embodiments of FIGS. 7A-7F and 10A-10K to provide an imaged assembly of FIG. 16E, which for example may be used:
  (i) by removal of non-perforated liner 48 and application to the inside of a window 10, or
  (ii) removal of perforated liner 42 and application to the outside of a window 10, or
  (iii) applied by discrete suckers or other fixings to the inside of a window 10, or
  (iv) hung as a banner,
indeed any of the methods of display preferred by any particular customer, for example an advertiser or building owner, for example a retailer.

While such a panel according to one or more embodiments has additional layers to the number that is strictly required to produce a see-through graphic panel, its general applicability will mean that a higher proportion of such panels, for example for Point of Purchase advertisements, will be adopted for display than any prior art panels, so justifying the additional cost of the materials of the assembly, which typically will be small compared to the cost of distribution and application in a typical "roll-out" of Point-of-Purchase advertisements to many locations, not to mention the total loss of value if panels of more limited application are not used at all, which research shows is often the case.

Open perforated materials according to one or more embodiments of the present invention are printable according to the method of the present invention by inkjet printing.

Figure 17A:
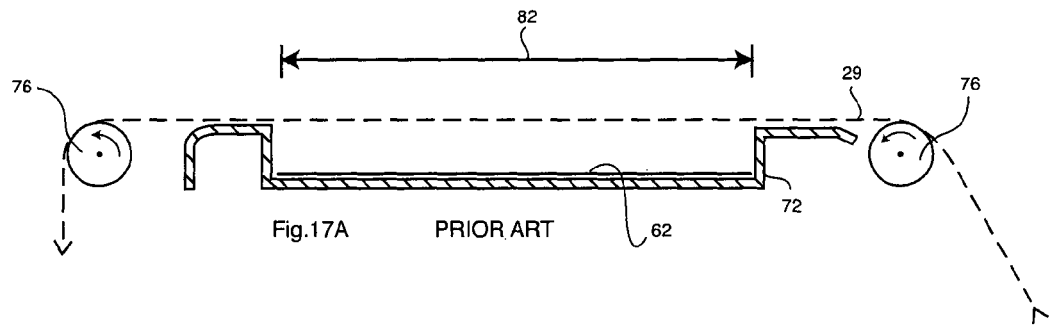
FIG. 17A is a diagrammatic partial cross-section through a PRIOR ART open gutter inkjet printer.
Figure 17B:
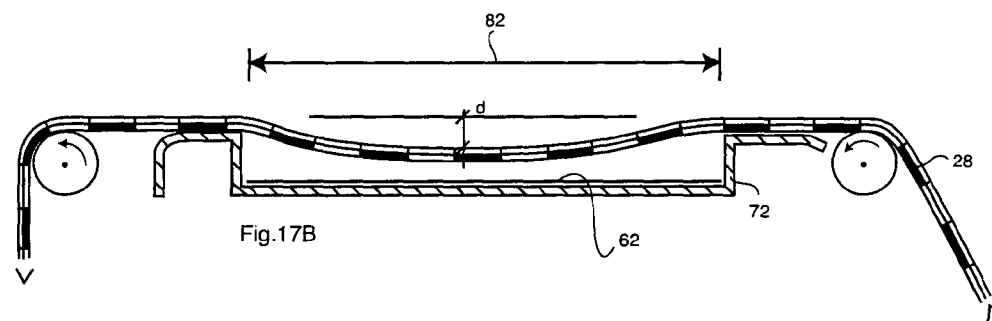
FIGS. 17B-17D are diagrammatic partial cross-sections through open gutter printers according to one or more embodiments of the present invention.

FIGS. 17A-17D are diagrammatic cross-sections through the imaging zone of open gutter digital inkjet printing machines. Prior art FIG. 17A illustrates the prior art use of open gutter inkjet printing machines for the printing of open weave fabric or mesh material 29 tensioned between rollers 76. A prior art printhead array prints a swathe width 82, the inkjet ink imaging open weave fabric or mesh 29. Ink which passes through the voids being deposited on open gutter 72 or optional ink receptive surface 62 of a disposable material, for example blotting paper. Such machines typically have a complex configuration of rollers, not illustrated, both requiring substantial leading and trailing sections of open weave fabric or mesh 29, in order to impart the necessary longitudinal tension. Optionally, rollers 76 are of "barrel" shape to impart lateral tension in the material being printed, which is typically lightweight and otherwise liable to folding and creasing but having the benefit of being easily maintained taut by modest tension. Conversely, as illustrated in FIG. 17B, a perforated assembly according to one or more embodiments of the present invention, typically significantly heavier than prior art fabric or mesh, printed in such machines would exhibit "drooping" or deflection "d" in a deflected form approximating to a catenary, caused by its own self-weight if held under similar tension to a typically light fabric or mesh. Such deformation would cause significant variation in the "print distance" between the array of inkjet printheads and the imaging surface of an open perforated material 28 comprising for example white and black vinyl film layers laminated together, which in turn would cause problems with the quality of the printed material 28. This would be exacerbated with heavier open perforated constructions incorporating an adhesive layer and liner. However, surprisingly, it has been found that prior art open gutter inkjet printing machines can be relatively easily adapted to enable the higher tensioning of the open perforated assemblies according to one or more embodiments of the invention, to reduce such deformation to an acceptable variation of print distance and thereby acceptable print quality.

However, the use of such prior art printing equipment typically requires the wastage of leading material in order to create the required tension across the open gutter or the provision of a leading length of a different material, for example a non-perforated length of vinyl, to avoid wastage of the open perforated material, an optional feature of one or more embodiments of the present invention.

As well as the option of a leading length of material, for example being joined by self-adhesive tape to the open perforated assembly, a connector, interlocking or otherwise interacting with the perforation holes, is optionally used. Whereas it is not easy to join a lead length to fabric, it is relatively easy to join to perforated materials, another advantage of one or more embodiments of the invention in the use of open gutter inkjet printers.

Figure 17C:
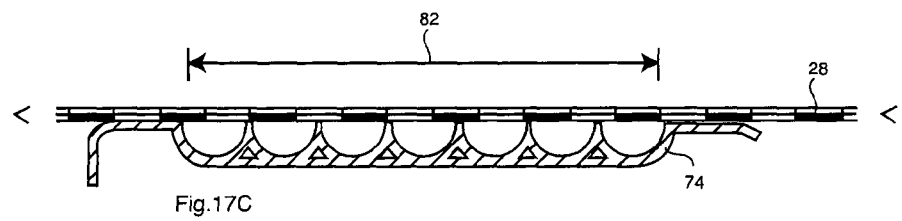
Figure 17D:
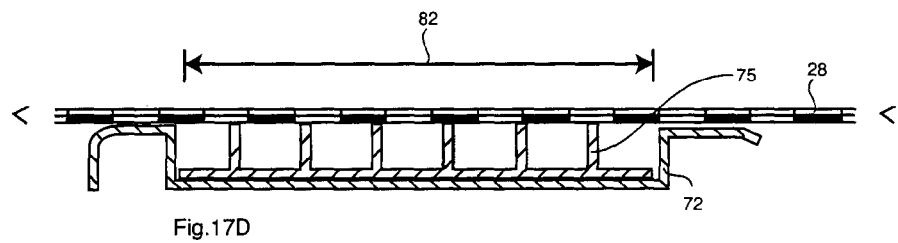

Conventional feeding of filmic materials, for example by nip rollers pushing the material towards and under the inkjet printheads, enables cutting of the material immediately after printing. For the printing of open perforated assemblies, this can be achieved by the provision of an open gutter 74 according to one or more embodiments of the present invention, as illustrated in FIG. 17C, comprising multiple open gutters of narrow width to enable sufficient support of the open perforated material 28 to enable it to be push-fed through the inkjet printing machine. Such a multiple open gutter 74 could be temporarily inserted in place of a conventional platen into an inkjet printing machine when it was required to print an open perforated material or it could be a permanent fixture for printing both open and solid materials. The multiple open gutters can be orientated in any direction. Some inkjet ink will be deposited through the perforation holes onto the tops of the separating walls of the multiple open gutters. However, the width of these walls is extremely narrow, typically less than 1 mm, and optionally is curved or pointed in cross-section, such that any inkjet ink that passes through the holes and is deposited onto the tops of the walls and thereby the underside of the perforated material is of very small quantity. Such small deposits of ink are not typically visible, being translucent CMYK (Cyan, Magenta, Yellow and process Black) inks, in the case of WYSIWYG-WATAW open self-adhesive assemblies with a black liner or black-coated liner. Alternatively, for example as illustrated in FIG. 17D, a temporary support device 75 comprising a plurality of walls creating a plurality of open gutters can be inserted into prior art open gutter 72 when printing open perforated assemblies according to one or more embodiments of the present invention, which may use intermediate supports to maintain an acceptable range of "print distance" throughout the swathe width 82. Optionally, the hole pattern can be arranged with lines of imperforate material along the length of the web which can be aligned with the walls of a multi-valley gutter orientated in the same direction, for example transverse alignment being ensured by a sprocket wheel to one side of the open perforated assembly.

According to one or more embodiments, the multiple valley gutter 74 or 75 is multi-purpose, being usable for the printing of both perforated and non-perforated substrates, which might otherwise be termed a universal platen. Optionally, a partial vacuum is established within the multiple gutter 74 or 75, typically when printing a non-perforated substrate.

Figure 18A:
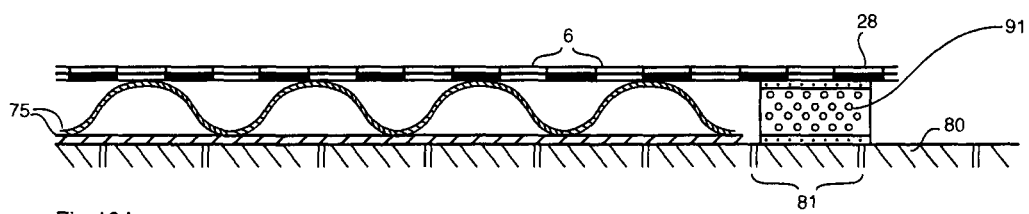
FIGS. 18A and 18B are diagrammatic partial cross-sections through a flatbed printer with a corrugated material supporting an open perforated assembly.

Another embodiment of the method of the invention, illustrated in FIG. 18A comprises the use of a corrugated material to enable the inkjet printing of open perforated materials on inkjet machines with a vacuum system to hold non-perforated substrates, for example flatbed machines. The corrugated material 75 typically comprises a single layer which is plane in repose on a flat surface, and a corrugated layer adhered discretely to the plane layer at the "troughs" of the corrugated layer, for example conventional corrugated paper. This is first placed, for example on a flatbed inkjet printing machine, typically comprising a vacuum system to hold down non-perforated substrates. In this embodiment, a form of multiple valley gutter is provided by the corrugated material, the flat side being held down to the bed by the partial vacuum suction mechanism and the upper corrugated side forming a discontinuous support to the open perforated assembly of one or more embodiments of the present invention. However, the risk of creasing and curling or other causes of deformation of the open perforated assembly makes it distinctly preferable (according to one or more embodiments) to tension the open perforated assembly across the "peaks" of the corrugated material, for example by means of double-sided foam core adhesive tape 91 located to either end or to either side or all four sides of a sheet of open perforated material to be printed, the thickness of the foam being selected to be approximately the same thickness as the corrugated material.

Figure 18B:
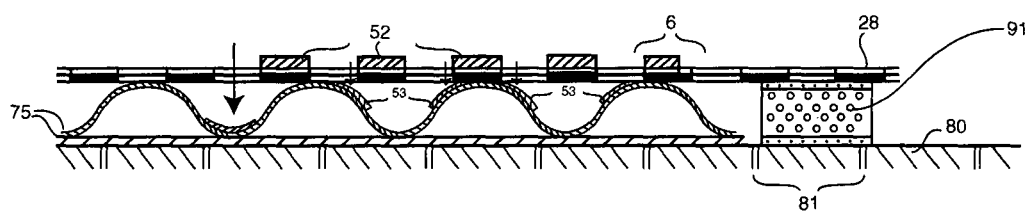

FIG. 18B is a diagrammatic partial cross-section through a flatbed inkjet printing machine showing printbed 80 with suction holes 81, which when a partial vacuum system in the printbed is activated holds down temporary corrugated material 75, for example a corrugated paper. In printing the design ink 52, excess ink 53 passes through the perforation holes 6 into the valleys or troughs of the corrugated material 75, as shown in FIG. 18B. The corrugated material is typically reused for the printing of several open perforated assemblies before being disposed of in an environmentally sound manner.

Figure 19:
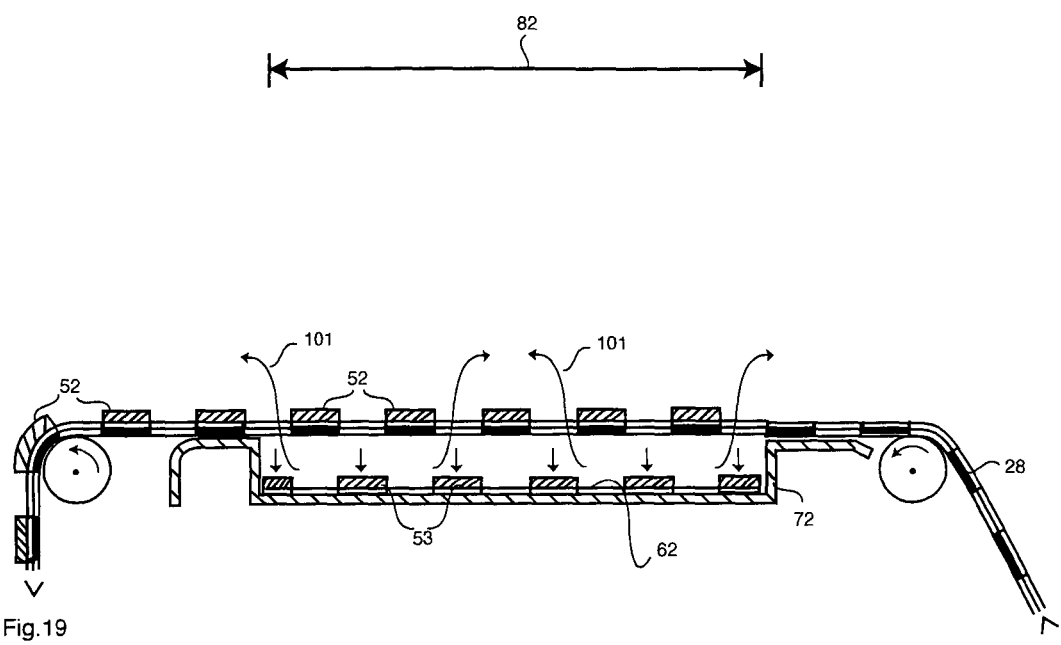
FIG. 19 is a diagrammatic partial cross-section through an open gutter printer according to one or more embodiments of the present invention.

FIG. 19 illustrates an advantage of one or more embodiments of the present invention over various prior art, the open holes providing forced or natural ventilation paths 101 which speed the curing of the inkjet ink forming design 52, thus reducing the energy used in printing or the possible need for post printing drying, for example on "drying racks", in "drying bins" or in "drying ovens". Drying racks are commonplace in the art of screen printing, typically comprising multi-level open metal grids that allow air to circulate above and below a sheet of imaged film or paper. Drying bins are used for web or roll material that has been imaged, a drying bin being sufficiently large for the roll of material to be loosely contained, allowing air circulation between the vertical surfaces by means of a perforated or open grid base, optionally having a fan underneath the base. Such alternative means of supplementary drying have been found to be necessary for solvent inkjet ink, for example before overlaminating. The elimination or reduction of the need for supplementary drying is partly because a significant portion of the ejected ink is never admitted to the drying portion of the printer. Because less ink is admitted, less energy is needed to cure what is admitted. An embodiment has been reduced to practice on a latex inkjet printer HP Designjet L65500, the latex ink and the printer supplied by Hewlett Packard, US. The excess ink that passes through the holes when printing a prior art perforated assembly with a non-perforated layer is deposited onto the non-perforated layer, which is depressed relative to the imaging surface and is therefore more difficult to cure or dry than the ink on the imaging surface, requiring supplementary drying. In imaging one or more embodiments of the present invention with latex ink, there are no hole recesses which retain the ink 53, which passes through to the receiving surface 62. Furthermore, the ventilation paths 101 further assisted the drying of the ink on the imaging surface of open perforated material 28, which required no supplementary racking or oven curing of the printed latex ink according to one or more embodiments. The need or otherwise for supplementary drying can be measured by a moisture meter which measures the electrical resistance between two pointed probes pressed against the imaged surface at a given distance apart; the greater the electrical resistance the drier the imaged layer. While it is very difficult to measure the reduced energy needed to cure an image according to one or more embodiments of the present invention to the same degree as on typical prior art perforated assemblies, it is easy to demonstrate the reduction in energy usage by subjecting the different assemblies to the same imaging and curing regime and measuring the improved curing, of one or more embodiments of the present invention by the increased electrical resistance in a moisture meter, for example of at least 10% greater than with one or more typical prior art assemblies.

To conduct a rigorous test using a water-based, solvent or latex inkjet machine, a removable additional backing layer is added to an open perforated assembly, for example by means of a self-adhesive application tape, to represent the prior art. Following imaging and curing of the same test image, for example a uniform, heavy CMYK black layer, the application tape is removed to leave assemblies of identical construction to be subjected to moisture measurement. The advantage of one or more embodiments of the present invention is not just the reduction of energy in curing but enabling a printer to optionally overlaminate and ship printed assemblies of one or more embodiments of the present invention earlier than typical prior art assemblies could be shipped.

Many inkjet printing machines heat substrates from the underneath, for example the liner side of a self-adhesive assembly, to assist curing of the ink Additional non-perforated backing layers or replacement liners of the prior art one-way vision assemblies provide insulation against such desired heat transfer. These layers are not present in assemblies according to one or more embodiments of the present invention, which also have open holes which enable the convection of heated air onto the imaged surface and radiant heat reflected off any surface above the heating element. One or more embodiments of the present invention typically have a lower thermal mass, having no solid or non-perforated layer, which may make the curing procedure more efficient in time and energy used. Furthermore, one or more embodiments of the present invention with a perforated liner with a black surface may absorb the heat from underneath more efficiently, again enhancing curing and enabling further energy reduction in curing, which is optionally yet further enhanced by especially heat-conductive black marking material, for example comprising metal particles.

Figure 20A:
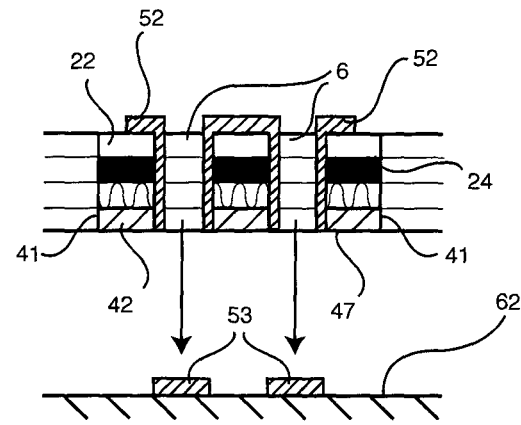
FIGS. 20A-20C are diagrammatic cross-sections through open perforated assemblies according to one or more embodiments of the present invention.
Figure 20B:
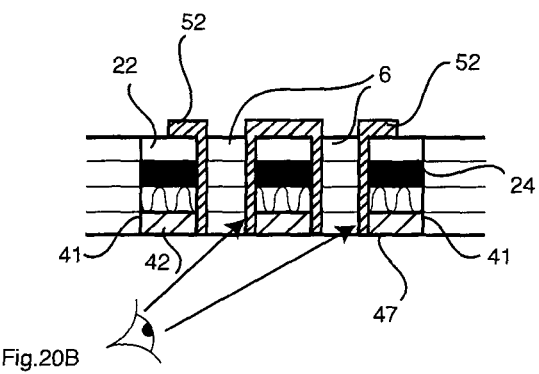
Figure 20C:
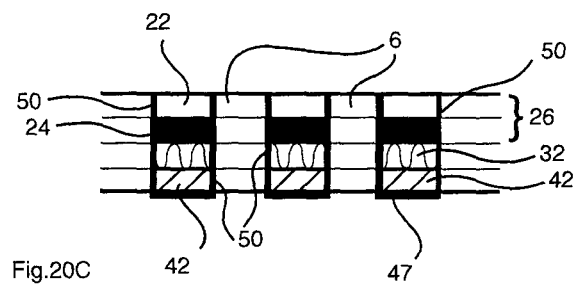

FIGS. 20 A-C illustrate the optional elimination of the prior art "ghost image" problem by coating a layer of light absorbing material, typically black, over any exposed white layer within hole edges. FIG. 20A is an enlarged cross-section showing diagrammatically the imaging of a perforated assembly similar to that in FIG. 7A, showing exposed white vinyl edge 23 which will allow any applied translucent CMYK inkjet ink to be visible as a "ghost image", exacerbated if there is also an exposed white liner edge 41 to a white liner 42, as shown in FIG. 20B. FIG. 20C illustrates an assembly with coated edges 50, for example by spraying with black marking material, for example black ink or paint, optionally to also provide a black rear coating 47 to a white perforated liner 42. The term 'black' in this context is used to include other light absorbing, dark colored marking material within a range of graytone from 70% to 100%. The resultant assembly according to one or more embodiments is WYSIWYG-WATAW and substantially eliminates the "ghost image" problem of the prior art, any translucent CMYK ink deposits on the inside edges of the perforation holes being rendered substantially invisible because of the underlying black coating. Also, there is little or no "whitening" of the image by exposed white edges when viewed the image side according to one or more embodiments. Furthermore, through vision from the other side is improved if there are black rather than white surfaces inside the hole edges. Optionally, such black coating has a silicone or other anti-blocking constituent to enable the assembly to be rolled without blocking, enabling easy unwinding of the roll as required. Alternatively, the black coating is subsequently coated with an anti-blocking agent. Optionally a black perforated liner material or black coating comprises carbon particles to reduce the ascertainable smells which are common in graphic materials.

In one or more of the above-discussed embodiments, a white polyester layer 22 or clear polyester layer 26 enables the use of direct or transferred dye sublimination imaging systems.

In one or more of the above-discussed embodiments, the perforated liner typically comprises paper and is optionally reinforced with a plastic material for example of polypropylene or polyethelene, typically on the release side of the liner.

It has been found that an open perforated self-adhesive assembly without a non-perforated layer according to one or more embodiments has several benefits over the widely used prior art perforated self-adhesive assemblies with an additional non-perforated backing layer. The cost of the additional non-perforated layer and its adhesion to the perforated liner are eliminated. Whereas an additional non-perforated backing layer locks in the deformation of perforation and therefore presents a substantially concave surface of pressure-sensitive adhesive upon application to a window, the "memory" of an open perforated, deformed plastic film may cause reverse creep back towards a planar construction, thus reducing the degree of concavity and thus improving the reliability of adhesive performance when the imaged open perforated self-adhesive assembly is applied to a window according to one or more embodiments.

In the case of various prior art replacement liner constructions, the cost of removing the perforated liner and replacing it with a non-perforated liner is eliminated according to one or more embodiments. Solvent inkjet ink deposited on the silicone-coated surface of a prior art replacement liner can migrate and have a deleterious effect on the pressure-sensitive adhesive exposed around the perimeter of each hole, and coalesces to reveal areas of a typical white liner which pale or weaken the perceived image, neither of which occur with open perforated self-adhesive assemblies according to one or more embodiments of the present invention. Also the problem with prior art replacement liner construction of UV cured inkjet ink bridging the holes is eliminated according to one or more embodiments, as this ink passes through the open holes onto the ink receiving surface.

In some applications, a temporary air-permeable premask or application tape is used to improve handlability and protect the imaged surface prior to and during application to a window.

If a transparent overlaminate is used for any reason, an open perforated self-adhesive assembly according to one or more embodiments of the present invention can be provided with conventional self-adhesive transparent overlaminates, for example self-adhesive polyester or self-adhesive cast or calendered vinyl films. However, if an overlaminate of the printed open perforated assembly is used, there may be the potential for airborne dirt to enter holes from the other side. One of the reasons for a non-perforated layer in the prior art constructions is to prevent such airborne dirt ingress and retention in the holes by an overlaminate. Optionally, an overlaminate can be applied that is not susceptible to dirt adhering in the manner of a pressure-sensitive overlaminate, for example the imaged open perforated assembly can be printed with a pressure-sensitive material which does not span across the holes but is applied only to the solid imaged area, to which may then be applied a clear overlaminate, for example a polyester film which has no pressure-sensitive adhesive. As another example, a heat-activated adhesive overlaminate can be used, the heat-activated adhesive not forming a surface to which dirt readily adheres before application to a window, unlike a pressure-sensitive adhesive. Such overlaminates according to one or more embodiments also have the benefit over various prior art self-adhesive overlaminates in that pressure-sensitive adhesive when not attached to another surface naturally deforms into a non-plane surface resulting from the globular nature of a pressure-sensitive adhesive, akin to deformé glass on a very small scale, producing a definite deterioration in the clarity of through-vision in a vision control panel according to various prior art constructions. It has been found that by taking precautions to prevent airborne dust coming in contact with the product before application to a window, overlamination is practical without significant entry of airborne dirt into the holes according to one or more embodiments. For example, one simple precaution to avoid dirt entering the holes which has been found to be effective according to one or more embodiments is the immediate wrapping of the imaged open perforated assembly, for example by rolling and insertion in a plastic tubular film sealed at one end and sealable at the other end. However, if an overlaminate is used and exposure to airborne dust cannot be so-avoided, a temporary non-perforated layer can be attached to the other side, for example in the form of a self-adhesive application tape.

One or more embodiments of the invention has been described so far in terms of conventional inkjet printing of a design addressed to the open perforated assembly as if it was desired to print the whole image, without regard to where the perforation holes were located. However, economy in ink use can be obtained by an optical "reading" device first determining the location of the perforation holes and substantially avoiding printing in the holes except, optionally, for slight incursion just inside the perimeter of each hole to accommodate any registration error between the hole identification and printing devices. Alternatively or in addition, a thin black ring outside each hole can be used to mask or "trap" any lack of registration. Black rings around each hole are a feature of laser perforation Inkjetting or spraying black colorant, for example ink or paint, onto the perforated liner, for example to create a WYSIWYG-WATAW open perforated self-adhesive assembly, will may also cause the insides of the holes to blacken, and some black colorant to migrate around the edges of the hole to form such masking black rings. Such treatments may also remove the visibility of design inks otherwise visible on the insides of the holes which would otherwise create a so-called "ghost image" from the other side of the assembly to the design.

Another advantage of open perforated assemblies according to one or more embodiments compared to various prior art assemblies comprising a non-perforated layer is that there is no non-perforated layer that can receive inkjet ink and therefore the curing can be optimised to suit that ink which falls on the solid portions of the perforated film layer, whereas various prior art constructions require ink to be cured that is received on a non-perforated layer, within the hole recesses. Also, the open holes may assist the flow of air, for example naturally convected, forced or heated, in removing solvents, water or other ink components that are intended to be removed by evaporation, which may be particularly desireable in the case of so-called latex inks comprising a substantial water content. The open holes may also assist the dissipation of heat following typical curing regimes for UV, solvent, aqueous and latex ink systems. Furthermore, the absence of a non-perforated layer reduces the thermal mass or inertia of open-perforated adhesive assemblies, making any curing system comprising heat more effective and subsequent cooling easier and quicker.

Printed assemblies according to one or more embodiments of the invention enable the printer and the customer to appraise the optical performance of the see-through graphics before shipment or application to the desired window, for example by holding an imaged assembly against a window in the printer's shop or customer's office, another advantage of one or more embodiments over the prior art.

One or more embodiments of the invention also makes perforated paper and synthetic paper films more viable as, if they are not adhered to a solid, non-perforated layer, any moisture entry into or egress from the material, for example through exposed hole edges, does not have the same curling effect, as there is no or reduced bi-material action caused by differential expansion or contraction of adjacent layers. One or more embodiments of the invention enables the adoption of advantageous materials as an alternative to the PVC (vinyl) films used in prior art constructions, for example for environmental reasons, for example paper being biodegradable, or fire rating reasons, emitting less harmful gases in combustion.

It should be understood that in the prior art constructions illustrated in FIG. 1C and FIG. 1F, the non-perforated additional backing layer 44 and the non-perforated replacement liner 46 respectively may provide so-called "lay-flat" properties, providing additional stability and preventing or limiting curling of the edges or creasing or other distortion that might otherwise occur. These layers may also provide additional resistance to bending compared to open perforated constructions of otherwise similar materials and thicknesses, for example of FIG. 1B, bending that might lead to creasing of the assembly when the elastic range of perforated liner 42, invariably paper in prior art constructions, is reached. Perforation patterns are typically on a square grid or an offset (triangular) grid, both of which may provide lines of weakness along lines of perforation, whereas the prior art materials used for inkjet printing have a reinforcing non-perforated layer. As well as potentially prejudicing subsequent imaging and performance quality, such curling and creasing could damage the very expensive printheads of an inkjet printing machine, requiring their replacement. One potentially desireable property of a substrate and its management is to avoid such damage to printheads and special care may be required with the printing of open perforated materials comprising a perforated paper liner to avoid and be watchful for such curling and creasing that could damage printheads during the printing process by projecting above the intended level of the substrate. Indeed, it is surprising that in tests on a range of inkjet printers, in reducing one or more embodiments of the invention to practice, that no such damage to printheads has occurred. Machines used in such test printing have included the Gandi Jetspeed 3348, which comprises an open gutter, the process of loading a roll of open perforated self-adhesive material through the trailing and leading roller assembly and the inkjet printing process not resulting in significant creasing or curling. In handling self-adhesive assemblies with a paper liner, any creasing typically occurs approximately perpendicular to the length of the roll and another optional aspect of one or more embodiments of the invention is for the liner 42 to have less flexural strength along the length or web of the assembly compared to the transverse direction, thus reducing the incidence of lateral creasing.

The rolling of an open perforated assembly into rolls for shipping and storage typically increases the risk of rolls being "blocked", which may prevent or inhibit the ease of unwinding achieved by prior art replacement liner or additional liner constructions with their continuous non-perforated surfaces typically treated to prevent such "blocking". Preferably, open perforated assemblies according to one or more embodiments of the present invention may be punched with sharp punch tools to reduce or minimize surface distortion to either side of the assembly, the mutual interaction of which could otherwise cause such "blocking". The perforated liner is may also be liable to cause shear forces and shear distortion within an assembly during rolling, unrolling and handling in a printing machine, for example when passing through nip rollers, one of which is being driven and the other of which is idling. Surprisingly, it has been found that suitable selection of materials, hole pattern and percentage of hole area may prevent such potential problems, an example construction that has been reduced to practice comprising a film thickness not less than 180 micron, a solvent, acrylic-based self-adhesive coating weight not less than 28 $g/m^2$ and a perforated silicone coated paper liner weight not less than 127 $g/m^2$ with approximately 40% transparency provided by 1.60 mm (0.063") diameter holes in an offset (triangular) grid at 2.40 mm (0.094") hole centers. It should be understood that this specification that has been reduced to practice does not limit the present invention in any way.

Another potential disadvantage of one or more embodiments of the invention compared to various prior art perforated adhesive assemblies, as well as possible increased likelihood of deformation in an inkjet printing process risking damage to printheads, is the damage that may be more likely to occur in transport and handling of a roll onto and off printing equipment, as there may be no non-perforated layer to protect the edge of the perforated film. Such damage to the ends of a roll of a film may be avoided or reduced (according to one or more embodiments) by the use of a projecting core to the roll and an end plate, part of which is inserted inside the core, which bears against the end of the core but maintains a space between the end of the roll and the end plate.

While the imaging of open perforated assemblies has previously been discussed in terms of inkjet printing, the products according to one or more embodiments of the invention can be imaged by many other imaging systems, including screen printing (flatbed, cylinder and rotary), airbrush, spray paint, coating, litho, flexo, thermal transfer digital, or the uniform application of thermal transfer layers, for example of pigmented resin or wax, typically in a heated roll laminator. Methods of imaging that are particularly advantageous according to one or more embodiments are those that reduce or eliminate the risk of open perforated assemblies creasing or curling, involving continuous tensioned open perforated assemblies, for example by web offset and rotary screen printing, in which also the printing equipment is set up and operated to avoid the transfer of ink through the holes, for example by using thixotropic inks.

Prior art perforated assemblies are perforated with the self-adhesive assembly imaging film layer uppermost, the punches first passing through the vinyl, which is also typical of one or more embodiments of the present invention. However, this method may create more deformation of the imaging film layer than the layers underneath, which is preferable for the application of an additional liner or replacement liner, non-perforated layer. With some methods of imaging, for example electrostatic transfer, an unprinted white ring is visible around each hole with the prior art constructions, which is not the case with such reversing of the direction of punching the perforated holes according to an optional aspect of one or more embodiments of the present invention, the perforation punches first passing through the liner, then the adhesive layer and then the face film.

Open perforated assemblies according to one or more embodiments of the invention may advantageously comprise a combination of materials, for example a white PVC film layer for imaging, laminated to a black polyester film layer to increase the tensile strength of the assembly and reduce the weight per area, before and after perforation, for example the polyester film enabling higher tensioning forces, which may create less deflection than prior art assemblies for unsupported spans, for example across an open gutter in inkjet printing machines.

Yet another advantage of open perforated assemblies according to one or more embodiments of the invention is in the creation of butt joints on a window. After one side of an imaged open perforated assembly has been applied to a window, there is a difficulty in aligning prior art constructions as the edge of the already applied side is not visible when imaged prior art material is positioned over it, because the non-perforated layer obstructs vision through the holes. According to one or more embodiments of the present invention, the edge of an already applied side can be seen through the open perforation holes to enable alignment of the other side to the butt joint.

Indices or factors useful in assessing the suitability of open perforated assemblies for different purposes, for example printing on prior art inkjet printing machines designed for open weave fabrics or meshes, include, among additional and/or alternative factors:

(i) mass/area (for example to assess deflection across an open gutter), typically lower for one or more embodiments of the present invention than prior art constructions. Open perforated materials are preferably (but not necessarily) less than 230 $g/m^2$, more preferably less than 200 $g/m^2$, an even more preferably less than 180 $g/m^2$;

(ii) tensile strength/mass (an index useful for assessing the capability to be tensioned and the resultant deflection, when spanning across an open gutter), typically (but not necessarily) higher for one or more embodiments of the present invention than prior art constructions; and (iii) flexural strength (a property useful in determining the printability in conventional, non-perforated vinyl printers in which the substrate is primarily pushed rather than primarily pulled under the printhead assembly), typically (but not necessarily) lower for one or more embodiments of the present invention than prior art constructions.

The foregoing illustrated embodiments are provided to illustrate the structural and functional principles of embodiments of the present invention and are not intended to be limiting. To the contrary, the principles of the present invention are intended to encompass any and all changes, alterations and/or substitutions within the spirit and scope of the following claims.

What is claimed is:

1. An open perforated assembly comprising a film layer on one side of said open perforated assembly, an adhesive layer and a release liner on the other side of said assembly, said film layer, said adhesive layer and said release liner being perforated with a plurality of holes, said open perforated assembly being devoid of any imperforate layer, wherein the perforated release liner comprises a first color visible from said other side of said assembly, wherein upon removal of the perforated release liner the light transmissivity of the assembly is within a variance of 5% to the light transmissivity before removal of the perforated release liner and wherein the average graytone of the color of solid portions of the assembly from said other side of said assembly is within a graytone variance of 30% to the average graytone of the solid portions of the assembly before removal of the perforated release liner, wherein said first color comprises a graytone in the range of 70%-100%.

2. An assembly as claimed in claim 1, wherein:
the one side of said open perforated assembly comprises a side of the perforated assembly that is separated from the adhesive layer and release liner by the film layer, and
the other side of said open perforated assembly comprises a side of the perforated assembly that is separated from the film layer by the adhesive layer and release liner.

3. An assembly as claimed in claim 1, wherein said appearance of the assembly from said other side of said assembly upon said removal of the perforated release liner and said appearance before said removal of the perforated release liner are substantially identical.

4. An assembly as claimed in claim 1, wherein said assembly is imaged with a design.

5. An assembly as claimed in claim 1, wherein said first color is black.

6. An assembly as claimed in claim 1, wherein said release liner has a light absorbing coating applied to said other side of said release liner.

7. An assembly as claimed in claim 6, wherein said light absorbing coating is black.

8. An assembly as claimed in claim 1, wherein said film layer comprises a white layer laminated to a black layer.

9. An assembly as claimed in claim 1, wherein said adhesive layer is black.

10. An assembly as claimed in claim 1, wherein a black coating is applied to the inside edges of said plurality of holes.

11. An assembly as claimed in claim 1, wherein said film layer is plastic.

12. An assembly as claimed in claim 11, wherein said film layer comprises one of
(i) polyvinylchloride,
(ii) polyester,
(iii) polyolefin.

13. An assembly as claimed in claim 1, wherein said assembly has a mass of less than 230 g/m$^2$.

14. An assembly as claimed in claim 13, wherein said assembly has a mass of less than 200 g/m$^2$.

15. An assembly as claimed in claim 13, wherein said assembly has a mass of less than 180 g/m$^2$.

16. An assembly as claimed in claim 1, wherein said film layer comprises a white polyester layer.

17. An assembly as claimed in claim 16, wherein a design is dye sublimated within said white polyester layer.

18. An assembly as claimed in claim 1, wherein said film layer comprises a black polyester layer.

19. An assembly as claimed in claim 1, wherein said assembly comprises a black ring outside each of said plurality of holes.

20. An assembly as claimed in claim 1, wherein said adhesive layer comprises a printable adhesive layer.

21. An assembly as claimed in claim 20, wherein said perforated release liner is removed and a said printable adhesive layer is imaged with a design.

22. An assembly as claimed in claim 21, wherein a non-perforated protective liner is applied to said imaged printable adhesive layer.

23. An assembly as claimed in claim 20, wherein said perforated release liner is removed and a non-perforated protective liner is applied to said printable adhesive layer.

24. An assembly as claimed in claim 1, wherein said film layer is translucent white.

25. An assembly as claimed in claim 1, wherein said film layer is transparent.

26. An assembly as claimed in claim 25, wherein said transparent film layer is imaged with a reverse-printed design and a white backing layer.

* * * * *